US009878523B2

(12) United States Patent
Uto et al.

(10) Patent No.: US 9,878,523 B2
(45) Date of Patent: Jan. 30, 2018

(54) LAMINATED FILM

(71) Applicant: TORAY Industries, Inc., Tokyo (JP)

(72) Inventors: Takayuki Uto, Otsu (JP); Kazuyoshi Ota, Otsu (JP); Yoshihiro Masuda, Otsu (JP); Wataru Goda, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/768,361

(22) PCT Filed: Mar. 14, 2014

(86) PCT No.: PCT/JP2014/056907
§ 371 (c)(1),
(2) Date: Aug. 17, 2015

(87) PCT Pub. No.: WO2014/156726
PCT Pub. Date: Oct. 2, 2014

(65) Prior Publication Data
US 2016/0001530 A1    Jan. 7, 2016

(30) Foreign Application Priority Data

Mar. 29, 2013  (JP) ................................. 2013-071455
May 21, 2013  (JP) ................................. 2013-106819
Oct. 28, 2013  (JP) ................................. 2013-223028

(51) Int. Cl.
| B32B 27/08 | (2006.01) |
| B32B 27/36 | (2006.01) |
| B32B 27/40 | (2006.01) |
| B32B 27/18 | (2006.01) |
| B32B 27/20 | (2006.01) |
| B32B 27/30 | (2006.01) |
| B32B 27/42 | (2006.01) |

(52) U.S. Cl.
CPC .............. *B32B 27/08* (2013.01); *B32B 27/18* (2013.01); *B32B 27/20* (2013.01); *B32B 27/306* (2013.01); *B32B 27/36* (2013.01); *B32B 27/40* (2013.01); *B32B 27/42* (2013.01); *B32B 2250/02* (2013.01); *B32B 2250/24* (2013.01); *B32B 2250/42* (2013.01); *B32B 2270/00* (2013.01); *B32B 2307/304* (2013.01); *B32B 2307/306* (2013.01); *B32B 2307/412* (2013.01); *B32B 2307/50* (2013.01); *B32B 2307/518* (2013.01); *B32B 2307/538* (2013.01); *B32B 2307/714* (2013.01); *B32B 2307/734* (2013.01); *B32B 2457/12* (2013.01); *B32B 2457/20* (2013.01)

(58) Field of Classification Search
CPC ....... B32B 27/08; B32B 27/20; B32B 27/306; B32B 27/36; B32B 27/40; B32B 27/42; B32B 2250/02; B32B 2250/24; B32B 2307/304; B32B 2307/306; B32B 2307/412; B32B 2307/50; B32B 2307/518; B32B 2307/538; B32B 2307/714; B32B 2307/734; B32B 2457/12; B32B 2457/20; B32B 2270/00
USPC ........................................... 428/423.1, 423.7
See application file for complete search history.

(56) References Cited

U.S. PATENT DOCUMENTS

| 2002/0064650 | A1* | 5/2002 | Masuda .................. B32B 27/18 428/336 |
| 2008/0174875 | A1* | 7/2008 | Iwata .................... G02B 5/0215 359/599 |
| 2008/0311385 | A1* | 12/2008 | Miyazaki ................ B32B 27/08 428/330 |
| 2009/0148687 | A1* | 6/2009 | Hirose .................... B29C 44/06 428/314.2 |
| 2010/0028693 | A1* | 2/2010 | Okafuji .................. H01B 1/127 428/423.7 |
| 2014/0340727 | A1* | 11/2014 | Mori ........................ G02B 1/04 359/241 |

FOREIGN PATENT DOCUMENTS

| CN | 102497985 A | 6/2012 |
| CN | 102725336 A | 10/2012 |
| JP | 06-255056 A | 9/1994 |
| JP | 2000-108286 A | 4/2000 |
| JP | 2003-246023 A | 9/2003 |

(Continued)

OTHER PUBLICATIONS

Chinese Office Action and Search Report, dated Mar. 16, 2016, for Chinese Application No. 201480010229.1, together with an English translation.
International Search Report issued in PCT/JP2014/056907 dated Jun. 17, 2014.

(Continued)

*Primary Examiner* — Thao T Tran
(74) *Attorney, Agent, or Firm* — Birch, Stewart, Kolasch & Birch, LLP

(57) ABSTRACT

[Problem] Provided is a laminated film which exhibits good general adhesiveness to PVAs, EVAs and PVBs having a wide range of saponification degrees as well as good moist heat-resistant adhesiveness.
[Means for Solution] The laminated film comprises a resin layer (α) composed of an aliphatic urethane structure-containing resin composition (I) on at least one side of a thermoplastic resin film, the resin layer (α) satisfying the following properties (i) and (ii): (i) the resin layer (α) has a surface free energy (sum of the dispersion force and the polar force) of not less than 30 mN/m and not greater than 45 mN/m; and (ii) the resin layer (α) has a polar force of not less than 5.0 mN/m and not greater than 15.0 mN/m.

14 Claims, No Drawings

(56) References Cited

FOREIGN PATENT DOCUMENTS

| JP | 2003-246033 A | | 9/2003 |
|---|---|---|---|
| JP | 2007253513 A | * | 10/2007 |
| JP | 2008212836 A | * | 9/2008 |
| JP | 2012-131123 A | | 7/2012 |
| JP | 2013-240993 A | | 12/2013 |
| WO | WO 2012/137662 A1 | | 10/2012 |

OTHER PUBLICATIONS

Written Opinion of the International Searching Authority issued in PCT/JP2014/056907 dated Jun. 17, 2014.
Japanese Office Action, dated Jul. 11, 2017, for Japanese Application No. 2014-514258, along with an English machine translation.

* cited by examiner

LAMINATED FILM

TECHNICAL FIELD

The present invention relates to a laminated film. More particularly, the present invention relates to a laminated film which is used as a laminated glass, a solar cell member or a polarizer protective film in combination with polyvinyl butyral (hereinafter, referred to as "PVB"), ethylene vinyl acetate (hereinafter, referred to as "EVA") or polyvinyl alcohol (hereinafter, referred to as "PVA").

BACKGROUND ART

Thermoplastic resin films, particularly biaxially stretched polyester films, have excellent properties such as mechanical properties, electrical properties, dimensional stability, transparency and chemical resistance; therefore, they have been widely used as substrate films in many applications, including magnetic recording materials and packaging materials. Further, depending on the product constitution, a novel functional layer is often arranged on the surfaces of these thermoplastic resin films. In the polarizer protective film application, as one example of such a functional layer, it has been examined to arrange a biaxially stretched polyester film, which is a thermoplastic resin film, on both sides of a polarizing PVA layer as a protective layer. Further, in another example, as a solar cell backsheet, EVA is arranged on a thermoplastic resin film to form a solar cell.

A polymer multilayer laminated film in which resins having different properties are alternately laminated is capable of exhibiting unique physical properties because of its laminated structure. For example, in Patent Document 1, a laminated film suitably used for glass protection, in which film the tearing resistance is improved by alternately laminating resins showing different mechanical properties, is proposed. Further, in Patent Documents 2 and 3, for example, a heat ray-shielding film which was enabled to selectively reflect light of specific wavelengths, particularly near-infrared radiations, by alternately laminating resins having different refractive indices, and a cold mirror which uniformly reflects visible light are proposed. For these films, utilizing their properties, in addition to those applications where the films are laminated with glass via an adhesive, various other applications have been examined, including laminated glasses prepared by inserting these films between two glass sheets via PVB or EVA and films for solar cell backsheets in which these films are laminated with EVA.

Furthermore, in recent years, in the fields of flat panel displays and touch panels, there is an increasing demand for various optical films such as polarizer protective films and transparent electroconductive films. Particularly, in the polarizer protective film application, for the purpose of cost reduction, it has been actively examined to replace conventional TAC (triacetyl cellulose) films with biaxially-stretched polyester films. However, those biaxially-stretched polyester films that have been examined in the past show higher retardation than TAC films due to the orientation generated in the polymers during stretching; therefore, there is a problem that, when these polyester films are assembled in liquid crystal displays, the retardation of the films causes the generation of interferences color and the quality of the displayed images is thereby deteriorated. In order to solve this problem, retardation-controlling methods have been proposed; however, the level of retardation achieved by these methods is still not satisfactory (for example, Patent Document 4). Alternatively, since retardation is proportional to the film thickness, retardation can also be suppressed by reducing the film thickness in the order of several micrometers; however, an excessive reduction in the film thickness deteriorates the ease of handling, and this approach is thus not practical in the polarizer protective film application. For this problem as well, the use of a polymer multilayer laminated film can potentially control the retardation and, by sandwiching a PVA layer serving as a polarizer with polymer multilayer laminated films having controlled retardation, a high-quality polarizing plate can be obtained.

Still, when other functional layer is arranged as in the above-described applications, the adhesiveness between a thermoplastic resin film and the functional layer presents a problem. For example, those biaxially-stretched polyester films that have been examined in the past do not show sufficient adhesiveness to PVA and EVA and have a problem in that the adhesiveness is deteriorated particularly in high-temperature, high-humidity tests.

In order to solve this problem, for example, with respect to the application for polarizer protection, there have been proposed a method of imparting a polyester film with processability and resistance to high humidity by laminating thereon a resin layer having a low glass transition point (patent Document 5); a method of laminating a resin layer composed of a hydrophilic group-containing copolymer resin on a polyester film (Patent Document 6); a method of incorporating a water-soluble polymer such as a PVA into a resin layer laminated on a polyester film and thereby allowing the resin layer to have a surface energy similar to that of the layer with which the resin layer is adhered (Patent Document 7); and a method of laminating a hydrophilic resin layer on a polyester film by an in-line coating method that applies the resin layer in the production process of the polyester film (Patent Document 8).

However, in the method of Patent Document 5, since a resin layer having a low glass transition point is laminated on the surface of a polyester film, modification of the resin layer at a temperature of the glass transition point or higher may cause whitening of the resin layer and deteriorate its adhesiveness to hydrophilic materials. In addition, when the polyester film is stored in a rolled state, blocking may occur in the rolled polyester film, making the polyester film unsuitable for practical use. Such a method of the Patent Document 6 in which a resin layer composed of a hydrophilic group-containing copolymer resin is laminated on a polyester film is capable of improving the adhesiveness to a certain extent by way of hydrogen bonds formed between the hydrophilic group contained in the resin layer and PVA; however, the improvement is not sufficient and the adhesiveness in a high-temperature and high-humidity environment is not satisfactory. Moreover, in such a method of Patent Document 7 in which a water-soluble polymer is incorporated into a resin layer laminated on a polyester film, the adhesiveness is improved by allowing the resin layer and PVA to have similar surface free energy; therefore, there is a problem with respect to the general adhesiveness in that, for example, even if the adhesiveness to a PVA having a certain saponification degree is improved, the adhesiveness to a PVA having a different saponification degree is deteriorated. In addition, since the resin layer is swollen in a high-temperature and high-humidity environment, the resulting film has poor moist heat-resistant adhesiveness. Such a method of Patent Document 8 where a hydrophilic resin layer is laminated on a polyester film by an in-line coating method that applies the resin layer in the production process of the polyester film also has the same problem as the method of Patent Document 7.

PRIOR ART REFERENCES

Patent Documents

[Patent Document 1] Japanese Patent No. 4867149
[Patent Document 2] Japanese Patent No. 4534637
[Patent Document 3] Japanese Patent No. 4967486
[Patent Document 4] Japanese Patent Application Laid-Open Publication (JP-A) No. 2011-85725
[Patent Document 5] Japanese Patent Application Laid-Open Publication (JP-A) No. 2011-156848
[Patent Document 6] Japanese Patent Application Laid-Open Publication (JP-A) No. H5-279502
[Patent Document 7] Japanese Patent Application Laid-Open Publication (JP-A) No. 2000-336309
[Patent Document 8] Japanese Patent Application Laid-Open Publication (JP-A) No. 2001-179913

SUMMARY OF THE INVENTION

Problems to be Solved by the Invention

In view of the above, an object of the present invention is to provide a laminated film which overcomes the above-described drawbacks and comprises a resin layer on at least one side of a thermoplastic resin film represented by a multilayer laminated film, the resin layer exhibiting general adhesiveness to films of PVB, EVA, PVA and the like that have a wide range of saponification degrees and being capable of maintaining the adhesiveness even in a high-temperature and high-humidity environment.

Means for Solving the Problems

The present invention includes the following constitutions. That is, the present invention includes:

(1) A laminated film, comprising a resin layer (α) composed of an aliphatic urethane structure-containing resin composition (I) on at least one side of a thermoplastic resin film, the resin layer (α) satisfying the following properties (i) and (ii): (i) the resin layer (α) has a surface free energy (sum of the dispersion force and the polar force) of not less than 30 mN/m and not greater than 45 mN/m; and (ii) the resin layer (α) has a polar force of not less than 5.0 mN/m and not greater than 15.0 mN/m;

(2) The laminated film according to (1), having a 10-point average roughness (Rz) of not less than 150 nm;

(3) The laminated film according to (1) or (2), wherein the resin composition (I) is a resin composition comprising an aliphatic urethane structure-containing aliphatic urethane resin (B);

(4) The laminated film according to any one of (1) to (3), wherein the aliphatic urethane structure of the resin composition (I) is an alicyclic urethane structure;

(5) The laminated film according to any one of (1) to (4), wherein the resin composition (I) comprises at least one of the structures represented by the following Formulae (1) to (5):

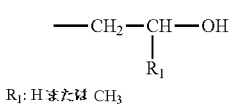
$R_1$: H または $CH_3$

式 (1)

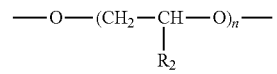
$R_2$: H または $CH_3$,
n: 正の整数

式 (2)

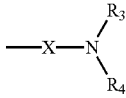

式 (3)

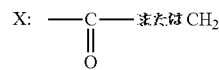

$R_3$, $R_4$: H, $CH_3$, $C_2H_5$, $CH(CH_3)_2$, $CH_2OH$ のいずれか

式 (4)

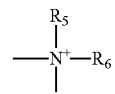

$R_5$, $R_6$, $R_7$: $CH_3$, $C_2H_5$ のいずれか

式 (5)

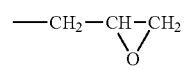

(6) The laminated film according to any one of (1) to (5), wherein the resin composition (I) is formed by coating a resin composition (II) on the laminated film, and the resin composition (II) is a blend of an acrylic-modified polyester resin (A) and the aliphatic urethane resin (B);

(7) The laminated film according to any one of (1) to (6), wherein the resin composition (II) is a hydrophilic solution;

(8) The laminated film according to (6) or (7), wherein the mass ratio of the acrylic-modified polyester resin (A) and the aliphatic urethane resin (B) in the resin composition (II) (content of (A) [parts by mass]/content of (B) [parts by mass]) is 50/50 to 90/10;

(9) The laminated film according to any one of (6) to (8), wherein the total content of the acrylic-modified polyester resin (A) and the aliphatic urethane resin (B) in the resin composition (II) is not less than 60% by mass with respect to the amount of the resin composition (II);

(10) The laminated film according to any one of (1) to (9), wherein the resin composition (II) comprises a melamine compound and/or a carbodiimide compound.

(11) The laminated film according to (10), wherein the total mass of the melamine compound and/or the carbodiimide compound in the resin composition (II) is not less than 10 parts by mass and not more than 40 parts by mass, taking the total content of the acrylic-modified polyester resin (A) and the aliphatic urethane resin (B) as 100 parts by mass;

(12) The laminated film according to any one of (1) to (11), having an internal haze of less than 0.5%;

(13) The laminated film according to any one of (1) to (12), wherein the thermoplastic resin film is a multilayer film having a structure in which layers composed of a thermoplastic resin A (layers A) and layers composed of a thermoplastic resin B (layers B) are alternately laminated in 5 or more layers;

(14) The laminated film according to (13), wherein the thermoplastic resin A is a crystalline polyester and the thermoplastic resin B is different from the crystalline polyester;

(15) The laminated film according to claim (14), having a retardation of 280 nm or less.

(16) A polarizing plate, comprising a combination of the laminated film according to (15) and a polarizer comprising a polyvinyl alcohol as a main component.

(17) The laminated film according to (13), having an average reflectance of not less than 70% in a wavelength range of 900 to 1,200 nm.

(18) The laminated film according to (17), wherein the resin layer (α) has a glass transition temperature of not lower than 20° C. and not higher than 45° C.

Effects of the Invention

The laminated film of the present invention has an effect of exerting good general adhesiveness to PVB, EVA and PVA as well as good moist heat-resistant adhesiveness.

MODE FOR CARRYING OUT THE INVENTION

The laminated film of the present invention will now be described in detail.

The present invention includes a laminated film which comprises a resin layer (α) composed of an aliphatic urethane structure-containing resin composition (I) on at least one side of a thermoplastic resin film, the resin layer (α) satisfying the above-described properties (i) and (ii). The laminated film of the present invention exhibits good general adhesiveness to PVA, EVA and PVB having a wide range of saponification degrees as well as good moist heat-resistant adhesiveness when laminated with PVA, EVA, PVB or the like to be used as a polarizer protective film, a solar cell backsheet or a heat-shielding film for a laminated glass.

(1) Resin Layer (α)

In the laminated film of the present invention, it is required that the resin layer (α) have a surface free energy (sum of the dispersion force and the polar force) of not less than 30 mN/m and not greater than 45 mN/m and that the resin layer (α) have a polar force of not less than 5.0 mN/m and not greater than 15.0 mN/m. The terms "surface free energy", "dispersion force" and "polar force" used in the present invention each refers to a value determined by the respective measurement methods described below. By controlling the surface free energy of the resin layer (α) to be not less than 30 mN/m, the resin layer (α) is allowed to exhibit good general adhesiveness to PVA having a wide range of saponification degrees as well as good moist heat-resistant adhesiveness. Meanwhile, by controlling the surface free energy of the resin layer (α) to be not greater than 45 mN/m, the surface free energy of the resin layer (α) is approximated to those of the hydrocarbon chain moieties, which are hydrophobic components, of PVA, EVA and PVB; therefore, the resin layer (α) can be imparted with good adhesiveness particularly to those PVA, EVA and PVB having a low saponification degree. In addition, even in a high-temperature and high-humidity environment, a reduction in the adhesiveness of the resin layer to PVA, EVA and PVB, which is caused by swelling due to moisture, can be inhibited, so that the resin layer is allowed to exhibit good moist heat-resistant adhesiveness. On the other hand, when the surface free energy of the resin layer (α) is greater than 45 mN/m, although the adhesiveness to PVA, EVA and PVB having a high saponification degree is improved, the adhesiveness in a high-temperature and high-humidity environment as well as the adhesiveness to PVA, EVA and PVB having a low saponification degree are deteriorated. In the those prior art technologies described in Patent Documents 7 and 8, the adhesiveness is improved by allowing a resin layer to have a surface free energy comparable to that of PVA, EVA or PVB to which the resin layer is adhered; therefore, in order to improve the adhesiveness to PVA, EVA and PVB having a high saponification degree, it is generally required that the surface free energy of the resin be increased to more than 45 mN/m, which makes it impossible to solve the above-described problems.

Further, by controlling the polar force, which is a component of the surface free energy, of the resin layer (α) to be not less than 5.0 mN/m, the resin layer (α) can be imparted with adhesiveness attributed to hydrogen bonds formed with hydroxyl groups contained in PVA, EVA and PVB. Meanwhile, by controlling the polar force to be not greater than 15.0 mN/m, even in a high-temperature and high-humidity environment, the resin layer (α) is enabled to maintain its adhesiveness to PVA, EVA and PVB without swelling due to moisture.

It is preferred that the laminated film of the present invention have a 10-point average roughness (Rz) of not less than 150 nm. Here, the "10-point average roughness (Rz)" is defined by JIS-B-0601-1994. While the laminated film has a hard surface, PVA, EVA and PVB are particularly characterized in that they soften even at relatively low temperatures. Such soft PVA, EVA and PVB can be deformed in conformity with the irregular shape of the laminated film surface. Accordingly, when the film surface have large irregularities, the area of adhesion is consequently increased, and this allows the laminated film to show high adhesive performance. The 10-point average roughness is preferably not less than 200 nm, more preferably not less than 250 nm. As the irregularity increases, the adhesion with PVA, EVA and PVB is improved. It is also preferred that the irregular shape of the film is formed by the resin layer (α) composed of the resin composition (I). Conventionally, for the purpose of imparting a film with Slipperiness, a technique of forming irregularities by addition of particles into the resin layer is employed. In this case, although the particle surface may not have sufficient adhesiveness to PVA, EVA or PVB, when the resin layer (α) composed of the resin composition (I) has an irregular shape, since the surfaces of all of the irregularities show good adhesiveness to PVA, EVA and PVB, high-level adhesion can be attained more efficiently. In order to obtain such an irregular shape, it is effective to form the resin composition (I) by coating a resin composition (II) on the laminated film and to use a blend of an acrylic-modified polyester resin (A) and an aliphatic urethane resin (B) as the resin composition (II).

In the present invention, the resin composition (I) forming the resin layer (α) contains an aliphatic urethane resin. It is preferred to incorporate an aliphatic urethane resin into the resin composition (I) forming the resin layer (α) because this enables the resulting resin layer (α) to exhibit general adhesiveness to PVA, EVA and PVB having a high saponification degree as well as moist heat-resistant adhesiveness. It is speculated that this effect is attributed to the following mechanism.

First of all, when the resin composition (I) forming the resin layer (α) contains an urethane resin, since the resin layer (α) can form hydrogen bonds with the hydroxyl groups of PVA, EVA and PVB, its adhesiveness can be improved particularly for those PVA, EVA and PVB having a high saponification degree. Further, when the resin composition (I) forming the resin layer (α) contains an aliphatic chain, the hardness of the resin layer can be reduced; therefore, even when PVA, EVA or PVB absorbs water and swells in a high-temperature and high-humidity environment, the resin layer can conform to the swelling of PVA, EVA or PVB and exhibit high moist heat-resistant adhesiveness.

Moreover, in a method where a hydrophilic solution prepared by dissolving PVA in a solvent such as water is coated, dried and laminated, since PVA adheres to the laminated film in the solvent drying process performed after coating the hydrophilic solution of PVA on the laminated film, free volumetric shrinkage is restrained in the thickness direction, so that a shrinkage stress is generated. This shrinkage stress can deteriorate the adhesion between PVA and the laminated film. In the laminated film of the present invention which comprises a resin layer ($\alpha$) on at least one surface, however, since the resin layer ($\alpha$) forms hydrogen bonds with PVA and has a low hardness, the resin layer ($\alpha$) is capable of conforming to the shrinkage of PVA, so that high adhesiveness can be maintained.

From the above, it is preferred that the resin composition (I) forming the resin layer ($\alpha$) contain an aliphatic urethane resin because this enables the resin layer ($\alpha$) to express general adhesiveness to those PVA, EVA and PVB having a high saponification degree as well as moist heat-resistant adhesiveness.

It is preferred that the aliphatic urethane resin contained in the resin composition (I) forming the resin layer ($\alpha$) be an alicyclic urethane resin. The term "alicyclic urethane resin" used herein refers to an aliphatic urethane resin in which a part of its aliphatic chain contains a cyclic structure. Among those resin compositions containing an aliphatic urethane resin, an alicyclic urethane resin-containing resin composition rather has a high glass transition temperature. Accordingly, the resin layer ($\alpha$) composed of an alicyclic urethane resin-containing resin composition is not soften or melted by the heat applied thereto during lamination with PVA, EVA or PVB or in a high-temperature and high-humidity environment, and the occurrence of bleeding of the resin composition to the resin layer surface is thus inhibited. Therefore, by incorporating an alicyclic urethane resin into the resin layer ($\alpha$)-forming resin composition (I), the resulting resin layer ($\alpha$) can have particularly excellent moist heat-resistant adhesiveness.

Meanwhile, when an aromatic urethane resin containing an aromatic chain as a part of its structure is used in place of an aliphatic urethane resin, since the aromatic urethane resin-containing resin composition yields a rigid resin layer due to the effect of the aromatic chain, the resin layer is not capable of conforming to shrinkage or swelling of a PVB, EVA or PVA layer, and this may lead to a reduction in the adhesiveness. In addition, problems such as yellowing of the resin layer with light may occur and, for example, when the resin layer is used as a member of a heat-ray shielding glass or solar cell or integrated into a display device such as a liquid crystal display as a polarizer protective film, yellowing of the resin layer may occur due to the effect of external light and the product quality may consequently be deteriorated.

It is preferred that the laminated film of the present invention comprise the resin layer ($\alpha$) as the outermost layer. By arranging the resin layer ($\alpha$) as the outermost layer, good adhesiveness to PVA, EVA and PVB can be obtained.

Further, it is preferred that the resin composition (I) forming the resin layer ($\alpha$) comprise at least one of the structures represented by the following Formulae (1) to (5). Since the structures of Formula (1) to (5) are polar groups that form a hydrogen bond with a hydroxyl group of PVA, EVA and PVB, the resin layer ($\alpha$) are capable of forming hydrogen bonds with PVA, EVA and PVB also at the sites of the Formula (1) to (5), so that the adhesiveness to PVA, EVA and PVB can be improved.

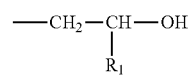

Formulae (1)

$R_1$: H or $CH_3$

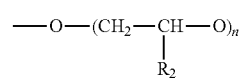

Formulae (2)

$R_2$: H or $CH_3$
n: positive number

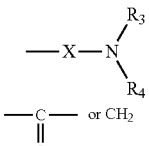

Formulae (3)

X: —C— or $CH_2$
   ‖
   O $R_3$, $R_4$: any one of H, $CH_3$, $C_2H_5$, $CH(CH_3)_2$ and $CH_2OH$

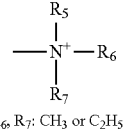

Formulae (4)

$R_5$, $R_6$, $R_7$: $CH_3$ or $C_2H_5$

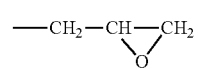

Formulae (5)

In the present invention, the "resin composition (I)" represents a resin composition forming a resin layer ($\alpha$). Further, the resin composition prior to the formation of the resin layer ($\alpha$) is represented as "resin composition (II)". By coating or laminating the resin composition (II) on a thermoplastic resin film, the resin layer ($\alpha$) composed of the resin composition (I) is formed.

The aliphatic urethane structure-containing resin composition (I) can be obtained by incorporating the below-described aliphatic urethane resin (B) into the resin composition (II). It is preferred that the resin composition (II) contain an acrylic-modified polyester (A), and the resin composition (II) may also contain a melamine compound and/or carbodiimide compound (C). The resin composition (II) will be described in the following sections (2) to (4).

In the resin composition (II) of the present invention, the below-described resins of (2) to (4) may be used individually, or two or more thereof may be mixed and/or copolymerized. Further, a resin other than those of (2) to (4) and various additives, such as a lubricant, inorganic particles, organic particles, a surfactant, a surface treatment agent, a stabilizer, a terminal sealant and a filler may be incorporated as well.

(2) Acrylic-Modified Polyester Resin (A)

The resin composition (I) forming a resin layer ($\alpha$) is obtained by coating and drying the resin composition (II), and it is preferred that the resin composition (II) comprise an acrylic-modified polyester resin (A). By incorporating the acrylic-modified polyester resin (A) into the resin composition (II) and modifying the content and/or the composition of the acrylic-modified polyester resin (A) in the resin composition (II), the surface free energy and the polar force of the resin layer ($\alpha$) can be controlled in the ranges of (i) and (ii), respectively.

The acrylic-modified polyester resin (A) that can be used in the present invention is one in which an acrylic resin component and a polyester resin component are mixed and/or bound with each other, examples of which include graft-type and block copolymer-type acrylic-modified polyester resins. In the acrylic-modified polyester resin (A), either the acrylic resin component or the polyester resin component may have a higher mixing ratio or copolymerization ratio.

The acrylic-modified polyester resin (A) can be produced, for example, by adding a radical initiator to both ends of a polyester to allow polymerization with acrylic monomers to take place, by adding a radical initiator to side chains of a polyester to allow polymerization with acrylic monomers to take place, or by attaching hydroxyl groups to side chains of an acrylic resin to allow reaction with a polyester having an isocyanate group or a carboxyl group to take place at a terminal.

The surface free energy of the resin layer ($\alpha$) can be reduced by increasing the content of the acrylic resin component in the acrylic-modified polyester resin (A), whereas the surface free energy of the resin layer ($\alpha$) can be increased by reducing the content of the acrylic resin component. In order to allow the resin layer ($\alpha$) to have a surface free energy in the range of (i), for example, the mass ratio of the acrylic resin component and the polyester resin component in the acrylic-modified polyester resin (A) (content of the acrylic resin component [parts by mass]/content of the polyester resin component [parts by mass]) can be controlled at 10/90 to 90/10. Particularly, when a polyester film is used as a substrate of the laminated film of the present invention, the polyester resin component of the acrylic-modified polyester resin (A) can provide good adhesion between the resin layer ($\alpha$) and the substrate polyester film.

It is preferred that the acrylic-modified polyester resin (A) comprise at least one of the structures represented by the above-described Formulae (1) to (5). By allowing the acrylic-modified polyester resin (A) to have at least one of the structures of the Formulae (1) to (5), hydrogen bonds can be formed with PVA, EVA and PVB, so that the adhesion therewith can be improved. Particularly, it is preferred that the structures of the Formulae (1) to (5) be contained as a structure of the acrylic resin component of the acrylic-modified polyester resin (A).

In the acrylic resin component constituting the acrylic-modified polyester resin (A), specifically, it is preferred that a hydrophilic radical-polymerizable vinyl monomer be polymerized to the main chain of an acrylic resin composed of an alkyl methacrylate and/or an alkyl acrylate. By incorporating this hydrophilic radical-polymerizable vinyl monomer into the acrylic resin component, the acrylic-modified polyester resin (A) can be provided with at least one of the structures represented by the Formulae (1) to (5).

It is preferred that, taking the whole amount of the acrylic resin component as 100 parts by mass, the amount of the hydrophilic radical-polymerizable vinyl monomer be not less than 20 parts by mass and not greater than 50 parts by mass. By controlling the amount of the hydrophilic radical-polymerizable vinyl monomer to be not less than 20 parts by mass and not greater than 50 parts by mass, the polar force of the resin layer ($\alpha$) can be controlled in the range of (ii), so that hydrogen bonds can be effectively formed with PVA, EVA and PVB and the adhesion with PVA, EVA and PVB can thereby be improved.

As the acrylic resin component, an alkyl methacrylate and/or an alkyl acrylate is used and, specifically, methacrylic acid, methyl methacrylate, ethyl methacrylate, isopropyl methacrylate, n-butyl methacrylate, isobutyl methacrylate, n-hexyl methacrylate, lauryl methacrylate, 2-hydroxyethyl methacrylate, hydroxypropyl methacrylate, acrylic acid, methyl acrylate, ethyl acrylate, isopropyl acrylate, n-butyl acrylate, isobutyl acrylate, n-hexyl acrylate, lauryl acrylate, 2-ethylhexyl acrylate and the like are preferably used. These acrylic resin components may be used individually, or two or more thereof may be used in combination.

As for the hydrophilic radical-polymerizable vinyl monomer, specifically, examples of a monomer yielding the structure of the Formula (1) include hydroxy acrylates such as 2-hydroxyethyl acrylate, 2-hydroxyethyl methacrylate, hydroxypropyl acrylate and hydroxypropyl methacrylate; examples of a monomer yielding the structure of the Formula (2) include glycol esters such as ethylene glycol acrylate, ethylene glycol methacrylate, polyethylene glycol acrylate and polyethylene glycol methacrylate; examples of a monomer yielding the structure of the Formula (3) include acrylamide compounds such as acrylamide, methacrylamide, N-methylolacrylamide and methoxymethylolacrylamide; examples of a monomer yielding the structure of the Formula (4) include cationic monomers such as aminoalkyl acrylates, aminoalkyl methacrylates, and quaternary ammonium salts thereof; and examples of a monomer yielding the structure of the Formula (5) include glycidyl acrylate compounds such as glycidyl acrylate and glycidyl methacrylate, unsaturated acids such as acrylic acid, methacrylic acid, maleic anhydride, itaconic acid and crotonic acid, and salts thereof. These hydrophilic radical-polymerizable monomers may be used individually, or a plurality thereof may be used in combination. Further, other vinyl monomer(s) copolymerizable with these hydrophilic monomers can also be used in combination.

Examples of such other copolymerizable vinyl monomer include vinyl esters such as vinyl acetate and vinyl propionate; vinyl halides such as vinyl chloride and vinyl bromide; unsaturated carboxylic acid esters such as methyl acrylate, ethyl acrylate, butyl acrylate, methyl methacrylate, ethyl methacrylate and butyl methacrylate; vinylsilanes such as dimethylvinylmethoxysilane and $\gamma$-methacryloxypropyltrimethoxysilane; and olefins and diolefin compounds, such as ethylene, propylene, styrene and butadiene.

The polyester resin component constituting the acrylic-modified polyester resin (A) is one which comprises an ester bond in the main chain or a side chain and is composed of a dicarboxylic acid component and a diol component. As a carboxylic acid component constituting the polyester resin, an aromatic, aliphatic or alicyclic dicarboxylic acid or a tri- or higher-valent polycarboxylic acid can be used. Examples of the aromatic dicarboxylic acid that can be used include terephthalic acid, isophthalic acid, orthophthalic acid, phthalic acid, 2,5-dimethylterephthalic acid, 5-sodium sulfoisophthalic acid, 1,4-naphthalenedicarboxylic acid, and ester-forming derivatives thereof.

As a glycol component of the polyester resin, for example, ethylene glycol, diethylene glycol, polyethylene glycol, propylene glycol, polypropylene glycol, 1,3-propanediol, 1,3-butanediol, 1,4-butanediol or neopentyl glycol can be used.

In cases where the polyester resin component is dissolved or dispersed in an aqueous solvent to be used as an aqueous resin composition, in order to facilitate the aqueous dissolution or dispersion of the polyester resin component, it is preferred to copolymerize a sulfonate group-containing compound and/or a carboxylate group-containing compound.

Examples of the carboxylate group-containing compound include, but not limited to, alkali metal salts, alkaline earth metal salts and ammonium salts of trimellitic acid, trimellitic anhydride, pyromellitic acid, pyromellitic anhydride, 4-methylcyclohexene-1,2,3-tricarboxylic acid, trimesic acid, 1,2,3,4-butanetetracarboxylic acid and 1,2,3,4-pentanetetracarboxylic acid.

Examples of the sulfonate group-containing compound include, but not limited to, alkali metal salts, alkaline earth metal salts and ammonium salts of sulfoterephthalic acid, 5-sulfoisophthalic acid, 5-sodium sulfoisophthalic acid and 4-sulfoisophthalic acid.

The acrylic-modified polyester resin (A) that is used in the resin composition (II) used for the formation of the resin layer (α)-forming resin composition (I) of the present invention can be produced by, for example, the below-described production method. First, a polyester resin component is produced in the following manner. For example, a polyester resin component can be produced by a method comprising: the first step of performing direct esterification reaction between a dicarboxylic acid component and a glycol component or transesterification reaction between a dicarboxylic acid component and a glycol component; and the second step of allowing the reaction product of the first step to undergo polycondensation reaction. In this method, as a reaction catalyst, for example, an alkali metal, an alkaline earth metal, manganese, cobalt, zinc, antimony, germanium or a titanium compound can be used.

Next, the thus obtained polyester resin component is dispersed in a solvent. Particularly, for dispersion in an aqueous solvent, the polyester resin is dissolved or dispersed in an aqueous solution of an alkaline compound, such as aqueous ammonia, sodium hydroxide, potassium hydroxide or an amine, under stirring. In this case, an aqueous organic solvent such as methanol, ethanol, isopropanol, butyl cellosolve or ethyl cellosolve may also be used in combination.

Then, in order to produce the acrylic-modified polyester resin (A), a polymerization initiator and, as required, an emulsification disperser and the like are added to the thus obtained dispersion of the polyester resin component and, while maintaining the temperature constant, an acrylic resin component is slowly added thereto. By subsequently allowing the resultant to react for several hours, a dispersion of acrylic-modified polyester can be produced. The thus obtained dispersion is a mixture of the acrylic-modified polyester resin component, the polyester resin component and the acrylic resin component.

The polymerization initiator is not particularly restricted, and a commonly used radical polymerization initiator, for example, a water-soluble peroxide such as potassium persulfate, ammonium persulfate or hydrogen peroxide, an oil-soluble peroxide such as benzoyl peroxide or t-butyl hydroperoxide, or an azo compound such as azodiisobutyronitrile, can be employed.

(3) Aliphatic Urethane Resin (B)

It is preferred that the resin composition (II) used for the formation of the resin layer (α)-forming resin composition (I) of the present invention comprise an aliphatic urethane resin (B). The aliphatic urethane resin (B) used in the present invention is not particularly restricted; however, it is preferably one which is obtained by polymerizing an aliphatic polyisocyanate compound and a polyol compound.

First, the aliphatic polyisocyanate compound used in the resin composition (II) will be described. As the aliphatic polyisocyanate compound used in the present invention, one containing a plurality of isocyanate groups in the molecule is preferably used, and examples thereof include 1,6-hexane diisocyanate, isophorone diisocyanate, methylene-bis(4-cyclohexylisocyanate), 2,2,4-trimethylhexamethylene diisocyanate, 1,4-hexamethylene diisocyanate, bis(2-isocyanateethyl)fumarate, bis(4-isocyanatecyclohexyl)methane, dicyclohexylmethane-4,4-diisocyanate, lysine diisocyanate, hydrogenated xylylene diisocyanate and hydrogenated phenylmethane diisocyanate. In the present invention, these aliphatic polyisocyanate compounds may be used individually, or two or more thereof may be used in combination.

In the present invention, any of the above-described aliphatic polyisocyanate compounds can be suitably used; however, thereamong, an alicyclic polyisocyanate compound is preferably used. The aliphatic urethane resin (B) in which an alicyclic polyisocyanate compound is polymerized has a high glass transition temperature among aliphatic urethane resins. Thus, such aliphatic urethane resin (B) is not soften or melted in a resin layer due to heat applied during lamination of PVA, EVA or PVB or under a high-temperature and high-humidity environment, nor does it bleed out to the resin layer surface, allowing the aliphatic urethane resin (B) to exist in the resin layer without being modified. This consequently enables to maintain the adhesiveness between the resin layer and PVA, EVA or PVB, particularly in the evaluation of moist heat-resistant adhesiveness.

Next, the polyol compound used in the resin composition (II) will be described. The polyol compound used in the resin composition (II) is not particularly restricted as long as it contains a plurality of hydroxyl groups. Examples of such a polyol compound include aromatic polyether polyols, aliphatic polyether polyols, polyester polyols, polycarbonate polyols and polycaprolactone polyols. Specific examples of these polyol compounds are described below in the order mentioned.

Examples of the aromatic polyether polyols include ethylene oxide-added diols of bisphenol A, propylene oxide-added diols of bisphenol A, butylene oxide-added diols of bisphenol A, ethylene oxide-added diols of bisphenol F, propylene oxide-added diols of bisphenol F, propylene oxide-added diols of bisphenol F, alkylene oxide-added diols of hydroquinone, and alkylene oxide-added diols of naphthoquinone.

Examples of the aliphatic polyether polyols include polyethylene glycol, polypropylene glycol, polytetramethylene glycol, 1,2-polybutylene glycol, polyisobutylene glycol, copolymer polyols of propylene oxide and tetrahydrofuran, copolymer polyols of ethylene oxide and tetrahydrofuran, copolymer polyols of ethylene oxide and propylene oxide, copolymer polyols of tetrahydrofuran and 3-methyltetrahydrofuran, and copolymer polyols of ethylene oxide and 1,2-butylene oxide. Among these aliphatic polyether polyols, examples of alicyclic polyether polyols include ethylene oxide-added diols of hydrogenated bisphenol A, propylene oxide-added diols of hydrogenated bisphenol A, butylene oxide-added diols of hydrogenated bisphenol A, ethylene oxide-added diols of hydrogenated bisphenol F, propylene oxide-added diols of hydrogenated bisphenol F, butylene oxide-added diols of hydrogenated bisphenol F, dimethylol compounds of dicyclopentadiene, and tricyclodecane dimethanol.

Examples of the polyester polyols include those which are obtained by reaction between a polyhydric alcohol, such as ethylene glycol, polyethylene glycol, propylene glycol, polypropylene glycol, tetramethylene glycol, polytetramethylene glycol, 1,6-hexanediol, neopentyl glycol, 1,4-cyclohexane dimethanol, 3-methyl-1,5-pentanediol, 1,9-nonanediol or 2-methyl-1,8-octanediol, and a polybasic acid, such as phthalic acid, isophthalic acid, terephthalic acid, maleic acid, fumaric acid, adipic acid or sebacic acid.

Examples of the polycarbonate polyols include 1,6-hexane polycarbonate.

Examples of the polycaprolactone polyols include polycaprolactone diols obtained by reaction between ε-caprolactone and a divalent diol such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexane dimethanol or 1,4-butanediol.

Examples of other polyol compounds that can be used in the resin composition (II) include ethylene glycol, propylene glycol, 1,4-butanediol, 1,5-pentanediol, 1,6-hexanediol, neopentyl glycol, 1,4-cyclohexane dimethanol, poly-β-methyl-δ-valerolactones, hydroxy-terminated polybutadienes, hydroxy-terminated hydrogenated polybutadienes, castor oil-modified polyols, diol-terminated compounds of polydimethylsiloxanes, and polydimethylsiloxane carbitol-modified polyols.

In the resin composition (II), any of the above-described polyol compounds can be suitably used; however, thereamong, an aliphatic polyether polyol is preferably used. By using an aliphatic polyether polyol, the hardness of the aliphatic urethane resin (B) can be reduced. Consequently, the hardness of a resin layer formed from the aliphatic urethane resin (B)-containing resin composition (II) can also be reduced; therefore, in response to shrinkage or swelling of PVA, EVA or PVB that occurs during lamination thereof on the resin layer, the resin layer can conform to the shape of PVA, EVA or PVB adhered with the urethane resin by way of hydrogen bonds.

It is noted here that, in the resin composition (II), the above-described polyol compounds may be used individually, or two or more thereof may be used in combination.

From the above-described points, as a concrete structure of the aliphatic urethane resin (B) used in the resin composition (II), it is particularly preferred that the aliphatic urethane resin (B) be composed of an aliphatic polyisocyanate compound and an aliphatic polyether polyol. Examples of the aliphatic polyisocyanate compound include 1,6-hexane diisocyanate, isophorone diisocyanate, methylene-bis(4-cyclohexylisocyanate), 2,2,4-trimethylhexamethylene diisocyanate, 1,4-hexamethylene diisocyanate, bis(2-isocyanateethyl)fumarate, bis(4-isocyanatecyclohexyl)methane, dicyclohexylmethane-4,4-diisocyanate, lysine diisocyanate, hydrogenated xylylene diisocyanate and hydrogenated phenylmethane diisocyanate.

Examples of the aliphatic polyether polyol include polyethylene glycol, polypropylene glycol, polytetramethylene glycol, 1,2-polybutylene glycol and polyisobutylene glycol.

The aliphatic urethane resin (B) used in the resin composition (II) can be obtained by dissolving or dispersing an aliphatic polyisocyanate compound, a polyol compound and, as required, a chain extender in water, and polymerization is carried out by a known method.

Examples of the chain extender include polyols such as ethylene glycol, 1,4-butanediol, trimethylolpropane, triisopropanolamine, N,N-bis(2-hydroxypropyl)aniline, hydroquinone-bis(β-hydroxyethyl)ether and resorcinol-bis(β-hydroxyethyl)ether; polyamines such as ethylene diamine, propylene diamine, hexamethylene diamine, phenylene diamine, tolylene diamine, diphenyl diamine, diaminodiphenylmethane, diaminodiphenylmethane, diaminodicyclohexylmethane, piperazine, isophorone diamine, diethylene triamine and dipropylene triamine; hydrazines; and water.

The content of the aliphatic urethane resin (B) in the resin composition (II) is not particularly restricted as long as it is in a range that allows the aliphatic urethane resin (B) to express general adhesiveness and moist heat-resistant adhesiveness to PVA, EVA and PVB having a high saponification degree; however, the content of the aliphatic urethane resin (B) is preferably not less than 6% by mass, more preferably 20% by mass to 50% by mass, with respect to the amount of the resin composition (II).

It is also preferred that the total content of the acrylic-modified polyester resin (A) and the aliphatic urethane resin (B) in the resin composition (II) be not less than 60% by mass with respect to the amount of the resin composition (II). When the total content of the (A) and (B) is not less than 60% by mass, the resulting resin layer shows good adhesion with PVA, EVA and PVB having a wide range of high saponification degrees, which is an effect of the (A) and (B), and good adhesion can thus be maintained even in a high-temperature and high-humidity environment.

Further, it is preferred that the mass ratio of the content of the acrylic-modified polyester resin (A) and that of the aliphatic urethane resin (B) in the resin composition (II) (content of (A) [parts by mass]/content of (B) [parts by mass]) be 50/50 to 90/10. When the ratio, content of (A) [parts by mass]/content of (B) [parts by mass], is 50/50 to 90/10, a good balance between the surface free energy and the polar force is attained and the resulting resin layer shows good adhesion with PVA, EVA and PVB having a wide range of high saponification degrees, so that good adhesion can be maintained even in a high-temperature and high-humidity environment.

It is also preferred that the resin composition (II) used in the laminated film of the present invention be a blend of the acrylic-modified polyester resin (A) and the aliphatic urethane resin (B). The use of the acrylic-modified polyester resin (A) and the aliphatic urethane resin (B) in the form of a blend makes it easy to control the 10-point average roughness (Rz) to be not less than 150 nm. The mechanism thereof is as follows. When the acrylic-modified polyester resin (A) and the aliphatic urethane resin (B) is used in the form of a blend, even though these resins appear to be uniformly dispersed at a glance as the resin composition (II) in a coated state around room temperature, the compatibility of these resins is reduced particularly when a high temperature is applied thereto in the processing steps, such as coating and solidification of the resin composition (II) on a film and stretching and heat treatment of the resultant. This brings the resins into a microscopically phase-separated state, and an irregular shape can be consequently provided. Meanwhile, when the acrylic-modified polyester (A) and the aliphatic urethane resin (B) are copolymerized or cross-linked using a cross-linking agent or the like, as compared to a case where these resins are used in a blend form, layer separation is less likely to occur and this consequently makes an irregular shape less likely to be formed.

It is preferred that the resin layer (α) have a glass transition temperature of not lower than 20° C. and not higher than 45° C. If the glass transition temperature of the resin layer (α) is lower than 20° C., when the resulting laminated film is stored in a rolled state, blocking may occur in the laminated film, which makes the laminated film unsuitable for practical use. Meanwhile, if the resin layer (α) has a glass transition temperature of higher than 45° C., particularly when the resin layer (α) is laminated with PVB, EVA or PVA at a low temperature, sufficient adhesion may not be attained. When the resin layer (α) has a glass transition temperature of higher than 45° C. and the heating conditions in the lamination process are enhanced so as to attain adhesion with PVB, EVA or PVA, curling and other defects may occur in the resulting laminated film.

In the resin composition (II), in addition to the above-described (A) and (B), a melamine compound and/or carbodiimide compound (C) and various additives, such as a lubricant, inorganic particles, organic particles, a surfactant and a surface treatment agent, may be incorporated as well.

(4) Melamine Compound and/or Carbodiimide Compound (C)

In the present invention, the resin composition (II) can contain a melamine compound and/or a carbodiimide compound (C) in addition to the acrylic-modified polyester resin (A) and the aliphatic urethane resin (B). It is preferred that, taking the total mass of the resin layers as 100% by mass, the mass of the melamine compound and/or carbodiimide compound (C) be 40% by mass or less. When the mass of the compound(s) (C) is 40% by mass or less, while maintaining the adhesiveness to hydrophilic materials, which is an effect of the resin layer (α), the properties of the resin layers such as flexibility and toughness can be improved.

As the melamine compound in the present invention, specifically, for example, a compound which is produced by allowing a methylol melamine derivative obtained by condensation between melamine and formaldehyde to undergo dehydration-condensation reaction with a lower alcohol such as methyl alcohol, ethyl alcohol or isopropyl alcohol and subsequently etherifying the resultant can be preferably used.

Examples of the methylol melamine derivative include monomethylol melamine, dimethylol melamine, trimethylol melamine, tetramethylol melamine, pentamethylol melamine and hexamethylol melamine.

The compound having a carbodiimide group is not particularly restricted as long as it is, for example, a compound having at least one carbodiimide structure represented by the following Formula (6) per molecule; however, from the standpoints of moist heat-resistant adhesiveness and the like, a polycarbodiimide compound having two or more carbodiimide structures in one molecule is especially preferred. Particularly, a polymer-type isocyanate compound having a plurality of carbodiimide groups at terminals or in side chains of a polymer such as a polyester resin or an acrylic resin can be preferably used because, when the resin layer (α) used in the present invention is arranged on a film to prepare a laminated film, not only the hardness and oligomer precipitation-inhibiting properties of the resin layer (α) but also the adhesiveness to various inks, hard coat agents and the like as well as moist heat-resistant adhesiveness, flexibility and toughness are improved.

  (6)

A known technique can be applied to the production of such a carbodiimide compound and, generally, it is obtained by polycondensation of a diisocyanate compound in the presence of a catalyst. As a diisocyanate compound which is a starting material of a polycarbodiimide compound, an aromatic, aliphatic or alicyclic diisocyanate or the like can be used, and specific examples thereof include tolylene diisocyanate, xylene diisocyanate, diphenylmethane diisocyanate, hexamethylene diisocyanate, cyclohexane diisocyanate, isophorone diisocyanate and dicyclohexyl diisocyanate. Further, in order to improve the water solubility and water dispersibility of the resulting polycarbodiimide compound, a surfactant and/or a hydrophilic monomer, such as a polyalkylene oxide, a quaternary ammonium salt of dialkylamino alcohol or a hydroxyalkyl sulfonate, may also be added within a range that does not eliminate the effects of the present invention.

Moreover, other compounds, for example, a known cross-linking agent such as an oxazoline compound, an epoxy compound or an isocyanate compound, can also be used optionally.

(5) Thermoplastic Resin Film

The laminated film of the present invention is a laminated film comprising a resin layer (α) at least one side of a thermoplastic resin film. The term "thermoplastic resin film" used in the present invention is a general term for films that are obtained using a thermoplastic resin and melt or soften with heat, and a thermoplastic resin film is used as a substrate film of the laminated film. Examples of the thermoplastic resin include polyester resins; polypropylene resins; polyolefin resins such as polyethylenes; polylactic acid resins; polycarbonate resins; acrylic resins such as polymethacrylate resins and polystyrene resins; polyamide resins such as nylon resins; polyvinyl chloride resins; polyurethane resins; fluorocarbon resins; and polyphenylene resins. The thermoplastic resin used in the thermoplastic resin film may be a monopolymer or a copolymer. Further, a plurality of resins may be used as well.

Representative examples of a thermoplastic resin film using these thermoplastic resins include polyester films; polyolefin films such as polypropylene films and polyethylene films; polylactic acid films; polycarbonate films; acrylic films such as polymethacrylate films and polystyrene films; polyamide films such as nylon; polyvinyl chloride films; polyurethane films; fluorine-containing films; and polyphenylene sulfide films. From the standpoints of mechanical strength, dimensional stability, transparency, chemical resistance and cost, polyester films and polyethylene films are preferred, and polyester films are particularly preferred.

In view of the above, the polyester resin constituting a polyester film that is particularly preferably used as a thermoplastic resin film in the present invention will now be described.

The term "polyester" is a general term for polymers containing ester bonds as primary bonding chains of the main chain, and polyesters containing at least one component selected from ethylene terephthalate, propylene terephthalate, ethylene-2,6-naphthalate, butylene terephthalate, propylene-2,6-naphthalate, ethylene-α,β-bis(2-chlorophenoxy)ethane-4,4'-dicarboxylate and the like as a main component can be preferably used. In the present invention, it is preferred to use polyethylene terephthalate as a polyester film. In cases where heat, shrinkage stress or the like acts on the thermoplastic resin film, it is preferred to use polyethylene-2,6-naphthalate, which has excellent heat resistance and rigidity.

The above-described polyester film is preferably biaxially oriented. The term "biaxially oriented polyester film" generally refers to one which is obtained by stretching an unstretched polyester sheet or film at a draw ratio of about 2.5 to 5 in each of the longitudinal direction and the width direction perpendicular thereto and subsequently subjecting the thus stretched polyester sheet or film to a heat treatment for completion of crystal orientation, and shows a biaxially-oriented pattern in wide-angle X-ray diffraction. When a polyester film is not biaxially oriented, the resulting laminated film does not have sufficient thermal stability, particularly dimensional stability and mechanical strength, and has poor planarity, which is not preferred.

In the polyester film, a variety of additives such as an antioxidant, a heat stabilizer, a weathering stabilizer, an ultraviolet absorber, an organic lubricant, a pigment, a dye, organic or inorganic fine particles, a filler, an antistatic agent and a nucleating agent may also be incorporated to such an extent that does not deteriorate the properties of the polyester film.

The thickness of the polyester film is not particularly restricted and it is selected as appropriate in accordance with the intended use and type thereof; however, from the standpoints of mechanical strength, ease of handling and the like, usually, the thickness of the polyester film is preferably 10 to 500 µm, more preferably 20 to 250 most preferably 30 to 150 µm. The polyester film may be a composite film obtained by co-extrusion, or a film obtained by laminating the obtained films by various methods.

(6) Multi-Layer Film

It is also preferred that the thermoplastic resin film used in the present invention comprise a structure in which layers composed of a thermoplastic resin (layers A) and layers composed of a thermoplastic resin B (layers B) are alternately laminated in 5 or more layers. The layer A composed of the thermoplastic resin A and the layer composed of a thermoplastic resin B (layer B) refer to layers showing different thermal properties, resin compositions and/or optical properties. Specifically, these layers refer to layers showing different melting points and glass transition temperatures in differential scanning calorimetry (DSC), layers showing different peak characteristics in infrared spectroscopy, nuclear magnetic resonance spectroscopy and the like, or layers whose refractive indices are different by 0.01 or more in any one of two perpendicular directions that are arbitrarily selected in a plane of the multilayer film and the direction perpendicular to the plane. Further, the term "alternately laminated" used herein means that the layer A composed of the thermoplastic resin A and the layer B composed of a thermoplastic resin B are laminated in a regular sequence in the thickness direction and, for example, in cases where the laminated film is composed of two thermoplastic resins A and B that have different thermal properties, the layers of the respective thermoplastic resins that are expressed as "layer A" and "layer B" are laminated in a regular sequence represented by A(BA)n (wherein, n is a natural number).

In this manner, by adopting a structure in which resins having different thermal properties, compositions and optical properties are alternately laminated, the resulting laminated film is allowed to express specific physical properties as described above. For example, by alternately laminating resins having different thermal properties, the orientation state of each layer can be controlled at a high level in the production of a multilayer film and this enables to suppress retardation, so that a multilayer film particularly suitable as a polarizer protective film can be obtained. Further, by alternately laminating resins having different optical properties, the resulting laminated film is allowed to exhibit interference reflection by which light having a wavelength designed based on the relationship between the difference in the refractive indices of the respective layers and the thickness of the layers can be reflected.

When the number of laminated layers is less than 4, depending on the properties of the different resins that are laminated and the thicknesses of their layers, various physical properties such as film-forming properties and mechanical and physical properties may be markedly affected and this, for example, potentially makes it difficult to form a biaxially-stretched film or causes a defect when the resulting laminated film is combined with other members to prepare a polarizer or glass; therefore, such a laminated film may not be suitable as a multilayer film preferably used in the present invention. Meanwhile, in a film in which 5 or more layers are alternately laminated as in the case of the multilayer film preferably used in the present invention, since thermoplastic resins are each uniformly arranged in the respective layers in contrast to a multilayer film having several layers, the film-forming properties and mechanical and physical properties can be stabilized. Particularly, in order to obtain a multilayer film having the properties of interference reflection, it is also preferred to alternately laminate the thermoplastic resins A and B in 100 or more layers, more preferably 200 or more layers, still more preferably 400 or more layers. There is no upper limit on the number of layers; however, an increase in the number of layers leads to an increase in the production cost associated with upscaling of the production apparatuses, and an increase in the film thickness deteriorates the ease of handling. Particularly, an increase in the film thickness may cause a defect in a post-processing step; therefore, realistically, the practical range of the number of layers is 10,000 or less.

In the multilayer film preferably used in the present invention, it is preferred that the thermoplastic resin A be a crystalline polyester and the thermoplastic resin B be different from the crystalline polyester. The term "crystalline" used herein means that the polyester has a melting enthalpy, which is determined by the above-described DSC measurement, of not less than 20 J/g. When the thermoplastic resin A is composed of a crystalline polyester, as compared to a case where both thermoplastic resins are amorphous resins, the resulting multilayer film has superior stretchability as well as superior stability in dimensional and physical properties; therefore, from the standpoints of stability in physical properties and the like, the multilayer film is preferably subjected to optimization of the physical properties by biaxial stretching or applied to a processing step or long-term use when it is combined with a glass to be used as a polarizer protective film. Particularly, when the properties of interference reflection are incorporated, since the refractive index is more easily improved in the crystalline polyester and a difference in refractive index can thus be easily set between the layers, the resulting multilayer film can be imparted with superior interference reflection performance. Further, since a difference in thermal properties can be easily set between the crystalline polyester and the thermoplastic resin B, retardation can be easily controlled as described below, so that the multilayer film is also suitably used as a polarizer protective film.

In the multilayer film preferably used in the present invention, it is also preferred that the thermoplastic resin B be a crystalline resin having a melting point that is lower than that of the crystalline polyester by 20° C. or more. In this case, by performing a heat treatment in the below-described heat treatment step at a temperature between the melting point of the thermoplastic resin B and that of the crystalline polyester, only the orientation of the thermoplastic resin B can be relaxed and a difference in refractive index can thus be easily set between the layers A and B, so that the resulting multilayer film can be imparted with superior interference reflection performance. In addition, since this makes it easy to suppress retardation caused by the layer B and the retardation can thus be easily controlled as described below, when the multilayer film is mounted on a liquid crystal display as a polarizer protective film, an interference color is not likely to be generated, which is preferred. The difference in melting point is preferably 40° C. or larger and, in this case, since a wide range of temperatures can be selected in the heat treatment step, the orientation relaxation of the thermoplastic resin B can be facilitated and the orientation of the crystalline polyester can be easily controlled.

In the multilayer film preferably used in the present invention, it is also preferred that the thermoplastic resin B be composed of an amorphous resin. As compared to a crystalline resin, an amorphous resin is less likely to cause orientation in the production of a biaxially-stretched film; therefore, an increase in retardation caused by the layer B composed of the thermoplastic resin B can be suppressed and a difference in refractive index can thus be easily set between the layers A and B, so that the resulting multilayer film can be imparted with superior interference reflection performance. Further, since this makes it easy to suppress retardation caused by the layer B and the retardation can thus be easily controlled as described below, when the multilayer film is mounted on a liquid crystal display as a polarizer protective film, an interference color is not likely to be generated, which is preferred. This effect is prominent particularly when a heat treatment step is incorporated into the production of the multilayer film, and the orientation generated in the layers composed of the amorphous resin during stretching in the film longitudinal and width directions can be completely relaxed by performing the heat treatment step. Particularly, in a polarizer protective film, this allows only the retardation caused by the layer A, which is substantially composed of a crystalline polyester, to affect the retardation of the multilayer film. The term "amorphous resin" used herein refers to a resin which does not shown any peak corresponding to a melting point in differential scanning calorimetry, and such a resin can be confirmed when the multilayer film shows substantially only one melting peak corresponding to a melting enthalpy of not less than 5 J/g in differential scanning calorimetry.

Examples of the thermoplastic resin that is used in the multilayer film preferably used in the present invention include linear polyolefins such as polyethylene, polypropylene, poly(4-methylpentene-1) and polyacetal; alicyclic polyolefins that are obtained by ring-opening metathesis polymerization or addition polymerization of norbornenes or by addition-copolymerization with other olefins; biodegradable polymers such as polylactic acid and polybutyl succinate; polyamides such as nylon 6, nylon 11, nylon 12 and nylon 66; aramids; polyesters such as polymethyl methacrylate, polyvinyl chloride, polyvinylidene chloride, polyvinyl alcohol, polyvinyl butyral, ethylene-vinyl acetate copolymer, polyacetal, polyglycolic acid, polystyrene, styrene-copolymerized polymethyl methacrylate, polycarbonate, polypropylene terephthalate, polyethylene terephthalate, polybutylene terephthalate and polyethylene-2,6-naphthalate; polyether sulfones; polyether ether ketones; modified polyphenylene ethers; polyphenylene sulfides; polyether imides; polyimides; polyallylates; tetrafluoroethylene resins; trifluoroethylene resins; trifluorochloroethylene resins; tetrafluoroethylene-hexafluoropropylene copolymers; and polyvinylidene fluorides. Thereamong, in the present invention, from the standpoints of strength, heat resistance, transparency and versatility, it is particularly preferred to use a crystalline polyester as the layer A. Further, it is preferred that the thermoplastic resin B, which is different from the crystalline polyester, be also composed of a polyester, from the standpoints of its strength, heat resistance, transparency and versatility as well as adhesiveness and lamination with the crystalline polyester. These thermoplastic resins may be in the form of a copolymer or a mixture of two or more resins.

As the polyester, one which is obtained by polymerization of monomers that contain an aromatic dicarboxylic acid or an aliphatic dicarboxylic acid and a diol as main components is preferred. Examples of the aromatic dicarboxylic acid include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyl dicarboxylic acid, 4,4'-diphenyl ether dicarboxylic acid and 4,4'-diphenylsulfone dicarboxylic acid. Examples of the aliphatic dicarboxylic acid include adipic acid, suberic acid, sebacic acid, dimer acid, dodecanedioic acid, cyclohexanedicarboxylic acid, and ester derivatives thereof. Among these dicarboxylic acids, terephthalic acid and 2,6-naphthalenedicarboxylic acid are preferred since they exhibit a high refractive index. These acid components may be used individually, or two or more thereof may be used in combination, and these acid components may also be partially copolymerized with an oxyacid such as hydroxybenzoic acid.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol, 2,2-bis(4-hydroxyethoxyphenyl)propane, isosorbate and spiroglycol. Thereamong, ethylene glycol is preferably used. These diol components may be used individually, or two or more thereof may be used in combination.

As the thermoplastic resins of the present invention, among the above-described polyesters, it is preferred to use, for example, polyethylene terephthalate and a polymer thereof, polyethylene naphthalate and a copolymer thereof, polybutylene terephthalate and a copolymer thereof, polybutylene naphthalate and a copolymer thereof, polyhexamethylene terephthalate and a copolymer thereof, or polyhexamethylene naphthalate and a copolymer thereof.

As for a preferred combination of the thermoplastic resins A and B to be used in the multilayer film preferably used in the present invention, it is preferred that the absolute value of the difference in the SP value between these thermoplastic resins be 1.0 or smaller. When the absolute value of the difference in the SP value is 1.0 or smaller, interlayer delamination is not likely to occur. It is more preferred that the thermoplastic resins A and B be a combination of thermoplastic resins that have the same basic skeleton. The term "basic skeleton" used herein refers to a repeating unit constituting a resin. For example, in cases where polyethylene terephthalate is used as one of the thermoplastic resins, from the standpoint of easily realizing a highly precise laminated structure, it is preferred that the other thermoplastic resin comprise ethylene terephthalate having the same basic skeleton as that of the polyethylene terephthalate. When the thermoplastic resins A and B have the same basic skeleton, a laminated structure having high lamination accuracy in which interlayer delamination at the laminate interface is not likely to occur can be obtained.

In a preferred combination of the thermoplastic resins A and B to be used in the multilayer film preferably used in the present invention, it is preferred that the difference in the glass transition temperature between the thermoplastic resins A and B be 20° C. or less. A difference in the glass transition temperature of larger than 20° C. leads to poor thickness uniformity in the production of a multilayer film and this causes variations in the interference reflection performance and retardation. In addition, when the resulting multilayer film is molded, problems such as overstretching are likely to occur.

As one example of the combination of resins for satisfying the above-described conditions, in the multilayer film preferably used in the present invention, it is preferred that the thermoplastic resin A comprise polyethylene terephthalate or polyethylene naphthalate, which is a crystalline polyester, and the thermoplastic resin B be a polyester comprising spiroglycol. The term "polyester comprising spiroglycol" used herein refers to a copolyester or homopolyester copolymerized with spiroglycol, or a polyester blended with such copolyester and/or homopolyester. A polyester comprising spiroglycol is preferred because, since the difference between the glass transition temperature thereof and that of polyethylene terephthalate or polyethylene naphthalate is small, the resulting film is not likely to be overstretched when molded and interlayer delamination is also not likely to occur. It is more preferred that the thermoplastic resin A comprise polyethylene terephthalate or polyethylene naphthalate and the thermoplastic resin B be a polyester comprising spiroglycol and cyclohexanedicarboxylic acid. When a polyester comprising spiroglycol and cyclohexanedicarboxylic acid is used, since the crystallinity can be reduced, retardation can be easily suppressed. In addition, since the difference between the glass transition temperature of a polyester comprising spiroglycol and cyclohexanedicarboxylic acid and that of polyethylene terephthalate or polyethylene naphthalate is small and such a polyester has excellent adhesiveness, the resulting film is not likely to be overstretched when molded and interlayer delamination is also not likely to occur.

In the multilayer film preferably used in the present invention, it was discovered that, particularly by using a polyester comprising spiroglycol as the thermoplastic resin B, the orientation of the layers each composed of the thermoplastic resin A or B can be controlled. That is, when a common thermoplastic resin such as polyethylene terephthalate, particularly a polyester, is stretched, it is strongly oriented in the stretching direction; however, when a thermoplastic resin B comprising spiroglycol is used as the other thermoplastic resin of the multilayer film, not only stretching thereof results in weak orientation due to the bulky skeleton of spiroglycol but also an orientation can be imparted and controlled in the direction perpendicular to the stretching direction. Accordingly, it was discovered that, when this multilayer film is used as a polarizer protective film, for example, during stretching thereof, retardation in the layers B composed of the thermoplastic resin B increases in the direction perpendicular to the film stretching direction as retardation in the layers A composed of the thermoplastic resin A increases in the film stretching direction, and this consequently cancels the retardation occurring in each of the layers A composed of the thermoplastic resin and the layers B composed of the thermoplastic resin B and allows a retardation-inhibiting effect to be exerted in the film as a whole.

In the multilayer film preferably used in the present invention, it is also preferred that the thermoplastic resin A comprise polyethylene terephthalate or polyethylene naphthalate, which is a crystalline polyester, and the thermoplastic resin B be a polyester comprising cyclohexane dimethanol. The term "polyester comprising cyclohexane dimethanol" used herein refers to a copolyester or homopolyester copolymerized with cyclohexane dimethanol, or a polyester blended with such copolyester and/or homopolyester. A polyester comprising cyclohexane dimethanol is preferred not only because it is capable of reducing the crystallinity so that a difference in the refractive index can be easily provided and retardation can thereby be suppressed, but also because the difference between the glass transition temperature of such a polyester and that of polyethylene terephthalate or polyethylene naphthalate is small and this makes overstretching as well as interlayer delamination of the resulting film unlikely to occur during molding. It is more preferred that at least one of the thermoplastic resins be an ethylene terephthalate polycondensate in which the amount of copolymerized cyclohexane dimethanol is not less than 15 mol % and not more than 60 mol %. Since this allows the resulting multilayer film to be in a substantially amorphous state, not only retardation can be suppressed and high interference reflection performance can be imparted, but also particularly the changes in retardation caused by heat and time can be made small and interlayer delamination is made unlikely to occur. An ethylene terephthalate polycondensate in which the amount of copolymerized cyclohexane dimethanol is not less than 15 mol % and not more than 60 mol % adheres with polyethylene terephthalate very strongly. Further, its cyclohexane dimethanol group assumes a cis or trans configuration as a geometric isomer and it also has a chair or boat form as a conformational isomer. Therefore, oriented crystallization of such an ethylene terephthalate polycondensate is not likely to occur even when it is co-stretched with polyethylene terephthalate, and breakage during the production of its film is thus unlikely to occur.

In the multilayer film preferably used in the present invention, it is preferred that the thermoplastic resin A constituting the layer A be a crystalline polyester and the layer A be the outermost layer. In this case, since the outermost layer is composed of the crystalline polyester, a biaxially-stretched film can be obtained in the same manner as in the case of a crystalline polyester film such as a polyethylene terephthalate film or a polyethylene naphthalate film. If the outermost layer is composed of, for example, an amorphous resin, when a biaxially-stretched film is prepared in the same manner as the below-described common sequentially and biaxially stretched film, problems such as defects in the film formation caused by adhesion to the film-forming equipments (e.g., rolls and clips) and deterioration of the surface properties may occur.

Further, in the thermoplastic resins, a variety of additives such as an antioxidant, a heat stabilizer, a weathering stabilizer, an ultraviolet absorber, an organic lubricant, a pigment, a dye, organic or inorganic fine particles, a filler, an antistatic agent and a nucleating agent may also be incorporated to such an extent that does not deteriorate the properties of the respective thermoplastic resins.

It is preferred that the multilayer film used in the present invention have an internal haze of less than 0.5%. Since this allows the multilayer film to maintain high transparency, it can be suitably used particularly in windows of automobiles and buildings as well as liquid crystal displays. An internal haze of 0.5% can be achieved by selecting a resin layer ($\alpha$) composed of a combination of resins having excellent compatibility.

Embodiments particularly preferred for the cases where the multilayer film of the present invention is used for protection of a polarizer will now be further described. In the multilayer film preferably used in the present invention, it is preferred that the retardation is 280 nm or less. The expression "the retardation is 280 nm or less" used herein means that the retardation is 280 nm or less at any position of the film. Generally, retardation is calculated as the product of the film thickness and the maximum difference in the refractive index between two perpendicular directions in the film plane; however, in a multilayer film such as the one preferably used in the present invention, since the refractive index of the film cannot be easily measured, the value of retardation is determined by an indirect method. Specifically, a value measured using a phase contrast analyzer KOBRA Series, which is available from Oji Scientific Instruments Ltd. and measures retardation by an optical method, is adopted as the value of retardation. In other words, the value of retardation is obtained by cutting out a sample of 3.5 cm×3.5 cm in size from a central part of the film width direction, setting the sample on the analyzer such that the film width direction is arranged at an angle of 0° as defined by the analyzer, and then measuring the retardation of light having a wavelength of 590 nm at an incidence angle of 0° and the orientation angle thereof. In cases where the multilayer film preferably used in the present invention is laminated with a polarizer to be used as a polarizer protective film, a high retardation value is problematic because it causes generation of interference colors when the film is mounted on a liquid crystal display and this leads to deterioration of the product quality. The retardation is preferably 200 nm or less, more preferably 100 nm or less, still more preferably 50 nm or less. As the retardation value decreases, the generation of interference colors becomes less likely to occur when the multilayer film of the present invention is mounted on a liquid crystal display as a polarizer protective film, which is preferred.

Further, it is preferred that the above-described multilayer film have a width of not less than 400 mm and the retardation values at both ends and the center of the multilayer film be all 280 nm or less. The term "both ends of the multilayer film" used herein refers to the regions of 50 mm or less from the respective ends in the width direction of the multilayer film having a width of not less than 400 mm. When the multilayer film is on a roll, the roll winding direction is defined as the film longitudinal direction, and the width direction of the roll corresponds to the film width direction. Meanwhile, when the multilayer film is in the form of a cut sheet, retardation is measured at both ends of the film long-side direction and the direction perpendicular thereto, and the direction having a larger difference from the center of the film is defined as the film width direction in the present invention. In a biaxially-stretched polyester film, stretching is performed in two perpendicular axial directions in the production thereof, and this stretching process causes variation in retardation in the film plane. More specifically, in sequential biaxial stretching often performed to prepare a biaxially-stretched film in general, stretching is performed in the film longitudinal direction and then in the film width direction and, depending on the case, the thus stretched film is subsequently subjected to a heat treatment; however, particularly in the process of stretching in the film width direction, the variation in stress between the longitudinal and width directions of the film causes a difference in retardation in the film width direction. Thus, it is generally known that, even if such retardation is suppressed in the center of the film width direction, the retardation increases toward the respective ends of the film in the width direction. Since variation in retardation is generated in the film width direction in this manner, particularly when the film is used as a protective film of a polarizer for large-size displays, variation in retardation is also generated in the polarizer plane, and such variation in retardation causes coloration of the parts having high retardation also when the film is mounted on a display device such as a liquid crystal display.

As a method of suppressing the above-described retardation, it is preferred to alternately laminate layers A composed of the thermoplastic resin A and layers B composed of the thermoplastic resin B in 5 or more layers. That is, in a common biaxially-stretched polyester film, an increase in the retardation is attributed to the difficulty of controlling the retardation uniformly as well as, in the case of a crystalline polyester film, a large film thickness, and even a slight anisotropy in the refractive index on the film causes an increase in the retardation which is the product of the anisotropy in refractive index and the film thickness. When layers composed of the thermoplastic resin A (layers A) and layers composed of the thermoplastic resin B (layers B) are alternately laminated, as compared to a film composed of a common crystalline polyester that has the same thickness, the retardation can be better suppressed by controlling the anisotropy in the refractive index of the thermoplastic resin B in accordance with the below-described method and reducing the total thickness of the layers A composed of the thermoplastic resin A with respect to the film thickness. More particularly, for example, the anisotropy in the refractive index of the layers B composed of the thermoplastic resin B can be reduced to non-existence by eliminating the orientation of the thermoplastic resin B in the film production process. Accordingly, in this case, the retardation is the product of the anisotropy in the refractive index of the layers A composed of a crystalline polyester and the total thickness of the layers A, so that the retardation can be better suppressed as compared to a film composed of only a crystalline polyester that has the same thickness.

Furthermore, by using this method, the thickness of layers that contribute to an increase in retardation is relatively reduced with respect to the film thickness also when retardation increases toward the respective ends in the film width direction; therefore, as a result, an effect of suppressing the retardation in the film width direction can also be obtained.

In the multilayer film preferably used in the present invention, it is also preferred that the ratio, total layer thickness of the layers A/total layer thickness of the layers B, be not smaller than 0.1 and not larger than 1.0. The term "total layer thickness" used herein refers to a value obtained by, in a cross-section cut out in the center of the multilayer film in the width direction, observing the lamination state under a transmission electron microscope (TEM) and adding up the thickness of all layers that are composed of the same resin. A smaller total layer thickness of the layers B with respect to the total layer thickness of the layers A is more preferred because this makes it easier to suppress retardation by controlling the orientation of the thermoplastic resin B. The ratio, total layer thickness of the layers A/total layer thickness of the layers B, is more preferably not smaller than 0.1 and not larger than 0.5, still more preferably not smaller than 0.1 and not larger than 0.3. In this case, since the thickness of the layers A composed of the thermoplastic resin A that contributes to retardation is very small with respect to the actual film thickness, a low retardation value that is comparable to that of a film having a thickness of mere several micrometers can be easily achieved. Meanwhile, when the ratio, total layer thickness of the layers A/total layer thickness of the layers B, is smaller than 0.1, the properties of the thermoplastic resin B dominate over the sequential stretchability of the film and this can make it difficult to obtain a high-quality biaxially-stretched film.

It is preferred that the multilayer film preferably used in the present invention have a thickness of not less than 10 μm and not greater than 50 μm. When the thickness of the multilayer film is less than 10 μm, since the ease of handling is impaired, it may be difficult to use the multilayer film as a polarizer protective film. Meanwhile, when the thickness of the multilayer film is greater than 50 μm, it may not be preferred to mount the multilayer film on a liquid crystal display because this increases the thickness of a polarizing plate to cause, for example, an increase in the weight and size of the liquid crystal display. The thickness of the multilayer film is more preferably 15 μm to 25 μm and, in this case, retardation can be easily suppressed while maintaining excellent ease of handling and mountability.

In the present invention, it is preferred that the multilayer film have a width of not less than 400 mm and the difference in the orientation angle between the ends and the center of the multilayer film be not larger than 20°. The term "orientation angle" used herein refers to a direction having the highest refractive index on the film and actually, the orientation angle is measured by an optical method in the same manner as retardation. A large difference in the orientation angle is not preferred because, when the multilayer film is mounted on a liquid crystal display, it causes coloration depending on the viewing angle and a reduction in the brightness. In sequential biaxial stretching performed in the production of a common biaxially-stretched polyester film, a clip tenter is used particularly when stretching the film in the width direction. In this method, in the process of stretching the film along a rail with both ends of the film being held by clips, the stress applied in the film transfer direction is different between the central part of the film and the parts near the clips and, this consequently causes a difference in the orientation angle. In cases where the difference in the orientation angle between the ends and the center of the multilayer film is 20° or less, when the multilayer film is mounted on a liquid crystal display as a polarizer protective film, coloration associated with the viewing angle and a reduction in the brightness can be inhibited. It is more preferred that the difference in the orientation angle between the ends and the center of the multilayer film be not larger than 10° and, in this case, when the multilayer film is mounted on a liquid crystal display, the liquid crystal display can attain a high quality with substantially no coloration or reduction in the brightness. In order to achieve the above-described multilayer film in which the difference in the orientation angle between the ends and the center thereof is not larger than 20°, the stretching conditions can be controlled as described below.

Next, embodiments preferred for the cases where the laminated film of the present invention is used as an interference reflection film, particularly as a heat ray-reflecting film, will be further described.

In the multilayer film preferably used in the present invention, it is required that the average relative reflectance (hereinafter, also referred to as "average reflectance") be 15% or less in the wavelength range of 400 to 700 nm. When the multilayer film shows reflection in the wavelength range of 400 to 700 nm, since the reflected light or transmitted light is colored, the multilayer film cannot be suitably used in such applications where high transparency is required, particularly automotive applications. Thus, by controlling the average reflectance in the wavelength range of 400 to 700 nm to be 15% or less, coloration of the reflected light and transmitted light that is attributed to reflection of visible light can be inhibited and a film that is suitable for applications where high transparency is required can be obtained. The lower the average reflectance in the wavelength range of 400 to 700 nm, the higher becomes the transparency of the film. Such a film can be obtained by highly precisely controlling the ratio of the optical thickness (layer thickness×refractive index) between all of adjacent layers composed of two different kinds of thermoplastic resins to be 1.

In the multilayer film preferably used in the present invention, it is required that the average reflectance be 70% or higher in the wavelength range of 900 to 1,200 nm. Sunlight has its intensity distribution primarily in the visible wavelength region and the intensity distribution tends to be smaller at a longer wavelength. However, in order to use the multilayer film preferably used in the present invention in such an application where it is required to be colorless and has high transparency, the multilayer film can hardly be allowed to block sunlight in the visible wavelength region. Therefore, by allowing the multilayer film to efficiently reflect light in the wavelength range of 900 to 1,200 nm (which accounts for about 18% of the total intensity of sunlight), which is a slightly longer wavelength range than the visible wavelength region, a multilayer film that is colorless and shows high heat ray-shielding performance can be preferably obtained. Meanwhile, an average reflectance of less than 70% in the wavelength range of 900 to 1,200 nm is not preferred because it makes the heat ray-shielding performance insufficient. The average reflectance in the wavelength range of 900 to 1,200 nm is preferably 80% or higher, more preferably 90% or higher. As the average reflectance in the wavelength range of 900 to 1,200 nm increases, superior heat ray-shielding performance can be provided. Such a film is required to have a large difference in the in-plane refractive indices between two or more resins having different optical properties; therefore, this film can be a multilayer film in which layers composed of a crystalline thermoplastic resin and layers composed of a thermoplastic resin that retains non-crystallinity when stretched or is fused in a heat treatment process are alternately laminated with each other.

The multilayer film preferably used in the present invention has an average reflectance of 70% or higher in the wavelength range of 900 to 1,200 nm. As in the case of the multilayer film preferably used in the present invention, when layers composed of a thermoplastic resin A (layers A) and layers composed of a thermoplastic resin B (layers B) having an optical property different from that of the thermoplastic resin A are alternately laminated, the reflectance of the resulting laminated film is determined by the below-described Equation 1. Usually, in a multilayer film preferably used for this purpose, by designing the multilayer film such that the ratio of the optical thickness (k) defined by the below-described Equation 2 becomes 1, the second-order reflection by the multilayer film, which is designed to reflect light having a wavelength of 900 to 1,200 nm, is suppressed. It is preferred that the layers having a larger optical thickness be composed of an amorphous thermoplastic resin. In this case, the stress applied by stretching to a curved portion of window glass in the glass lamination process can be reduced while imparting the window glass with high heat ray-shielding performance, so that generation of wrinkles and irregularities in the glass lamination process can be inhibited.

$$2 \times (na \cdot da + nb \cdot db) = \lambda \quad (1)$$

$$|(na \cdot da)/(nb \cdot db)| = k \quad (2)$$

na: in-plane average refractive index of layer A
nb: in-plane average refractive index of layer B
da: thickness (nm) of layer A
db: thickness (nm) of layer B λ: main reflection wavelength (primary reflection wavelength)

k: optical thickness ratio

In the multilayer film preferably used in the present invention, the difference in the in-plane average refractive index between the thermoplastic resin A and the thermoplastic resin B is preferably 0.03 or larger, more preferably 0.05 or larger, still more preferably 0.10 to 0.15. When the difference in the in-plane average refractive index is smaller than 0.03, an adequate reflectance cannot be attained, so that satisfactory heat ray-shielding performance may not be obtained. In order to achieve the above-described difference in the in-plane average refractive index, for example, at least one of the thermoplastic resins is crystalline and at least one of other thermoplastic resins is amorphous. In this case, a difference in the refractive index can be easily provided in the stretching or heat treatment step in the film production.

In the multilayer film preferably used in the present invention, it is preferred that the average rate of change in the heat shrinkage in the temperature range of 100° C. to 150° C., which is determined by thermomechanical analysis, be not less than 0.01%/° C. in both the longitudinal direction and the direction perpendicular thereto. The term "thermomechanical analysis" used herein refers to a method in which deformation of a substance is measured as a function of temperature by applying a non-oscillatory load to the substance while changing the temperature of the substance in accordance with a controlled program, and this measurement is performed by a commercially available thermomechanical analyzer. Further, the "heat shrinkage" is defined by the below-described Equation (3). The heat shrinkage that is generally determined by measuring the sample length around room temperature actually reflects not only the dimensional change in the heating process but also the dimensional change in the cooling process; therefore, it cannot exactly reflect the actual laminated glass production steps. However, a thermomechanical analysis is capable of reproducing the actual laminated glass production steps. The term "average rate of change in the heat shrinkage" used herein refers to a value obtained by dividing the difference between the heat shrinkage at 100° C. and the heat shrinkage at 150° C. by the temperature difference. The greatest heat shrinkage of an interlayer occurs in the temperature range of 100 to 150° C. where the laminated glass production steps are carried out. As the degree of change in the heat shrinkage increases with respect to the temperature change, the generation of wrinkles and delamination are more suppressed, so that a laminated glass having good outer appearance can be obtained. Here, when the average rate of change in the heat shrinkage is less than 0.01%/° C., since the change in the heat shrinkage is small with respect to the temperature, the multilayer film cannot cope with the change in the heat shrinkage of an interlayer during temperature increase, and this causes the generation of wrinkles. On the other hand, when the average rate of change in the heat shrinkage is less than 0.01%/° C. or higher, since the multilayer film can sufficiently cope with the change in the heat shrinkage of an interlayer during temperature increase, a film having good outer appearance without any wrinkles can be obtained. The average rate of change in the heat shrinkage is more preferably 0.01%/° C. to less than 0.10%/° C., still more preferably 0.01%/° C. to less than 0.05%/° C. Such a multilayer film can be obtained by adjusting the below-described film-forming conditions. Furthermore, the heat shrinkage can also be controlled in the above-described range by using a crystalline thermoplastic resin as at least one of the thermoplastic resins and an amorphous thermoplastic resin as at least one of other thermoplastic resins.

$$\text{Heat shrinkage}(T° C.)=(L(25° C.)-L(T° C.))/L(25° C.)\times 100 \quad (3)$$

L(T° C.): sample length at T° C.

Next, a preferred method of producing the multilayer film preferably used in the present invention will be described using a multilayer film composed of thermoplastic resins A and B, which are crystalline resins, as an example. Needless to say, the present invention should not be interpreted in any way restrictive to this example. Further, the laminate structure of the multilayer film preferably used in the present invention can be simply realized in the same manner as described in the paragraphs [0053] to [0063] of JP-A No. 2007-307893.

The thermoplastic resins are each prepared in the form of a pellet or the like. The pellets are dried as required in hot air or under vacuum and then fed to separate extruders. In the respective extruders, each resin is heat-melted at a temperature of not lower than its melting point and the amount of the resin to be extruded is made uniform by a gear pump or the like, and foreign substances, modified resin and the like are removed by a filter or the like. These resins are each molded into an intended shape by a die and subsequently discharged. Then, the multilayer laminated sheet discharged from the die is extruded onto a cooling body such as a casting drum and cooled to solidify, thereby a casting film is obtained. In this process, it is preferred to allow the sheet to rapidly cool to solidify by adhering the sheet to the cooling body such as a casting drum by an electrostatic force using, for example, a wire-form, tape-form, needle-form or knife-form electrode. Alternatively, a method of allowing the sheet to rapidly cool to solidify by adhering the sheet to a cooling body such as a casting drum using air blown from a slit-form, spot-form or plane-form apparatus, or a method of allowing the sheet to rapidly cool to solidify by adhering the sheet to a cooling body using a nip roll, can also be preferably employed.

The multilayer film preferably used in the present invention is obtained by using different thermoplastic resins and, in this case, the plural resins are discharged from different flow paths using two or more extruders and then fed to a multi-layer lamination apparatus. As the multi-layer lamination apparatus, a multi-manifold die, a feedblock, a static mixer or the like can be used; however, particularly, in order to efficiently attain the constitution of the present invention, it is preferred to use a feedblock having 11 or more fine slits. The use of such a feedblock does not call for an extremely large apparatus; therefore, the amount of foreign matters generated by thermal degradation is small, and this enables to laminate even an extremely large number of layers with high precision. In addition, the lamination accuracy in the width direction is considerably improved as compared to the prior art. Moreover, in this apparatus, since the thickness of each layer can be adjusted by changing the shape of the slits (length, width), arbitrary layer thicknesses can be achieved.

The thus formed molten multilayer laminate having a desired layer constitution is introduced to a die, and a casting film is obtained in the same manner as described above.

It is preferred that the thus obtained casting film be subjected to biaxial stretching. The term "biaxial stretching" used herein refers to stretching in the longitudinal and transverse directions. The stretching in the two directions may be performed sequentially or simultaneously. In addition, the thus biaxially stretched film may also be subjected to re-stretching in the longitudinal direction and/or the transverse direction.

First, a case where sequential biaxial stretching is performed will be described. The term "stretching in the longitudinal direction" used herein refers to stretching performed for the purpose of imparting a film with a molecular orientation in the longitudinal direction and it is usually performed by utilizing a difference in the peripheral speed between rolls. This stretching may be performed in a single step or in multiple steps using a plurality of roll pairs. The stretching ratio varies depending on the resin type; however, usually, it is preferably 2 to 15-fold. When polyethylene terephthalate is used as one of the resins constituting the multilayer film, the stretching ratio is particularly preferably 2 to 7-fold. Further, it is preferred that the stretching temperature be in the range of the glass transition temperature of a resin constituting the multilayer film to the glass transition temperature+100° C.

The uniaxially stretched film obtained in this manner is subjected to, as required, a surface treatment such as corona treatment, flame treatment or plasma treatment. Then, by performing the step of coating a resin composition (II) thereon, a resin layer ($\alpha$) is formed. The method of forming the resin layer ($\alpha$) will be described below in detail.

The term "stretching in the transverse direction" refers to stretching performed for the purpose of imparting an orientation to a film in the width direction and usually, using a tenter, a film is conveyed with both ends being held by clips so as to be stretched in the transverse direction. The stretching ratio varies depending on the resin type; however, usually, it is preferably 2 to 15-fold. When polyethylene terephthalate is used as one of the resins constituting the multilayer film, the stretching ratio is particularly preferably 2 to 7-fold. Further, it is preferred that the stretching temperature be in the range of the glass transition temperature of a resin constituting the multilayer film to the glass transition temperature+120° C.

In cases where the multilayer film preferably used in the present invention is used as a polarizer protective film, in order to inhibit variations in the retardation and orientation angle in the film width direction, it is preferred to employ different transversal stretching speeds. Specifically, when the section of transversal stretching is divided in two, the stretching amount of the film (film width at a measurement point−film width before stretching) in the midpoint of the transversal stretching section is preferably not less than 60%, more preferably not less than 70%, of the stretching amount at the end of the transversal stretching section. By changing the stretching ratio in the transversal stretching section in this manner, variations in the retardation and orientation angle in the film width direction can be inhibited and, consequently, when the multilayer film is mounted on a liquid crystal display, the liquid crystal display can attain a high quality with no coloration or reduction in the brightness.

Further, in cases where the multilayer film preferably used in the present invention is used as a polarizer protective film, it is also preferred to stepwisely change the temperature during the transversal stretching. Specifically, when the section of transversal stretching is divided in two, the atmosphere temperature of the stretching section has a difference of 20° C. or more between the front and back halves that are defined by the midpoint of the transversal stretching section. As used herein, the "atmosphere temperature" may be any temperature as long as it satisfies the above-described condition in a part of the front half of the transversal stretching section as well as in a part of the back half. It is preferred that the difference in the atmosphere temperature be 40° C. or larger. By stepwisely changing the stretching temperature in the transversal stretching section in this manner, variations in the retardation and orientation angle in the film width direction can be inhibited and, consequently, when the multilayer film is mounted on a liquid crystal display, the liquid crystal display can attain a high quality with no coloration or reduction in the brightness.

The thus obtained biaxially stretched film is preferably subjected to a heat treatment in a tenter at a temperature of not lower than the stretching temperature but not higher than the melting point so as to be imparted with flatness and dimensional stability. By performing such a heat treatment, the dimensional stability of the film to be molded is improved. After being heat-treated in this manner, the resulting film is uniformly and slowly cooled and then further cooled to room temperature to be rolled up. In addition, as required, a relaxation treatment or the like may also be performed in combination in the period between the heat treatment and the slow cooling.

Next, a case where simultaneous biaxial stretching is performed will be described. When the thus obtained cast film is subjected to simultaneous biaxial stretching, after subjecting the film to a surface treatment such as corona treatment, flame treatment or plasma treatment as required, a resin layer ($\alpha$) is formed by in-line coating.

Then, the resulting cast film is introduced to a simultaneous biaxial tenter and conveyed with both ends being held by clips so as to be stretched in the longitudinal and transverse directions simultaneously and/or stepwisely. Examples of a simultaneous biaxial stretching machine include pantograph-type, screw-type, drive motor-type and linear motor-type stretching machines, among which drive motor-type and linear motor-type stretching machines, in which the stretching ratio can be arbitrarily changed and a relaxation treatment can be performed at any position, are preferred. The stretching ratio varies depending on the resin type; however, usually, it is preferably 6 to 50-fold in terms of the area ratio. When polyethylene terephthalate is used as one of the resins constituting the multilayer film, the stretching ratio is particularly preferably 8 to 30-fold in terms of the area ratio. Particularly, in cases where simultaneous biaxial stretching is performed, in order to reduce the difference in the in-plane orientation, it is preferred that the stretching ratios in the longitudinal and transverse directions be the same and that the stretching speeds in these directions be also substantially the same. Further, it is preferred that the stretching temperature be in the range of the glass transition temperature of a resin constituting the multilayer film to the glass transition temperature+120° C.

It is preferred that the thus obtained biaxially stretched film is continuously subjected to a heat treatment in the tenter at a temperature of not lower than the stretching temperature but not higher than the melting point so as to be imparted with flatness and dimensional stability. In this heat treatment, in order to inhibit inconsistent distribution of the main orientation axis in the transverse direction, it is preferred to perform a relaxation treatment instantly in the longitudinal direction immediately before and/or immediately after the film enters the heat treatment zone. After being heat-treated in this manner, the resulting film is uniformly and slowly cooled and then further cooled to room temperature to be rolled up. In addition, as required, a relaxation treatment may also be performed in the longitudinal direction and/or transverse direction in the period between the heat treatment and the slow cooling. This relaxation treatment is performed instantly in the longitudinal direction immediately before and/or immediately after the film enters the heat treatment zone.

(7) Method of Forming Resin Layer (α)

The method of forming a resin layer (α) according to the present invention comprises the step of coating a resin composition (II) on at least one side of a thermoplastic resin film. In this formation method, it is preferred that the resin composition (II) contain an acrylic-modified polyester (A) in addition to an aliphatic urethane resin (B).

When coating the resin composition (II) containing the acrylic-modified polyester resin (A) and the aliphatic urethane resin (B) on the thermoplastic resin film, the resin composition (II) may also contain a solvent. That is, the acrylic-modified polyester resin (A) and the aliphatic urethane resin (B) may be dissolved or dispersed in the solvent to prepare a coating solution, and this may be coated on the thermoplastic resin film. Thereafter, by drying the solvent and heating the coated solution, a film on which a resin layer (α) is laminated can be obtained. In the present invention, it is preferred to use an aqueous solvent (D) as the solvent. The use of an aqueous solvent is preferred not only because rapid evaporation of the solvent in the heating process can be inhibited, so that a uniform resin layer can be formed, but also because an aqueous solvent is excellent from the standpoint of its environmental load.

The term "aqueous solvent (D)" used herein refers to water or a mixture prepared by mixing water with a water-soluble organic solvent, such as an alcohol (e.g., methanol, ethanol, isopropyl alcohol or butanol), a ketone (e.g., acetone or methyl ethyl ketone) or a glycol (e.g., ethylene glycol, diethylene glycol or propylene glycol), at an arbitrary ratio As a method of coating the resin composition (II) on a polyester film, either an in-line coating method or an off-line coating method can be employed; however, it is preferred to employ an in-line coating method. The "in-line coating method" refers to a method in which coating is performed within the process of producing a polyester film. Specifically, this method refers to one in which coating is performed at an arbitrary stage in the period between the time when a polyester resin is melt-extruded and the time when the resulting film is biaxially stretched, heat-treated and then rolled up. Usually, the resin composition (II) is coated on any one of the following films: an unstretched (non-oriented) polyester film obtained by melt-kneading and then rapidly cooling a polyester, which film is in a substantially amorphous state (film A); a uniaxially-stretched (uniaxially-oriented) polyester film obtained by stretching the film A in the longitudinal direction (film B); and a non-heat treated, biaxially-stretched (biaxially oriented) polyester film which is obtained by further stretching the film B in the width direction (film C).

In the present invention, it is preferred to employ a method in which: the resin composition (II) is coated on either of the films A and B, which are both polyester films in which crystal orientation is yet to be completed; the solvent is evaporated; and then the resulting polyester film is uniaxially or biaxially stretched and heat-treated to complete the crystal orientation of the polyester film and to thereby form a resin layer. This method is advantageous in terms of the production cost because the production of a polyester film, the coating of the resin composition (II), the drying of the solvent and the heating process (that is, the formation of a resin layer) can all be carried out at the same time. In addition, since stretching is performed after the coating process, it is easy to further reduce the thickness of the resulting resin layer.

Particularly, a method in which: the resin composition (II) is coated on a film uniaxially stretched in the longitudinal direction (film B); the solvent is evaporated; and then the resulting film is stretched in the width direction and heat-treated is excellent. This is because this method, as compared to a method in which the resin composition (II) is coated on an unstretched film and the resulting film is biaxially stretched, involves one less post-coating stretching step and is thus less likely to cause defects and cracks in the resulting resin layer due to stretching, and a resin layer having excellent transparency and smoothness can thereby be formed.

Meanwhile, the "off-line coating method" refers to a method in which, a resin composition is coated on a film obtained by uniaxially or biaxially stretching the film A and performing a heat treatment thereon to complete the crystal orientation of this polyester film or on the film A in a process different from the production process of the respective film. In the present invention, from the standpoints of the various advantages described above, it is preferred that the resin layer (α) be formed by an in-line coating method.

In the present invention, the best method of forming the resin layer (α) is one in which a resin layer is formed by coating a resin composition comprising an aqueous solvent (D) on a polyester film by an in-line coating method, drying the aqueous solvent (D) and then heating the resultant.

(8) Method of Preparing Resin Composition (II)

In the preparation of the resin composition (II), it is preferred that the aqueous solvent (D) be used as a solvent. The resin composition (II) can be prepared by mixing the acrylic-modified polyester resin (A) and the aliphatic urethane resin (B), which have been dispersed or dissolved in water as required, as well as the melamine compound and/or carbodiimide compound (C) and the aqueous solvent (D) in an arbitrary order at a desired mass ratio and stirring the resulting mixture. Here, it is required that the surface free energy (sum of the dispersion force and the polar force) of the resin layer (α) be adjusted in the range of 30 mN/m to 45 mN/m and that the polar face of the resin layer (α) be adjusted in the range of 5.0 mN/m to 15.0 mN/m and, in these ranges, the resin layer (α) can exhibit good adhesiveness and moist heat-resistant adhesiveness to PVAs having a wide range of saponification degrees. Subsequently, as required, a variety of additives such as a lubricant, inorganic particles, organic particles, a surfactant, an antioxidant and a thermal initiator can be mixed and stirred with the thus obtained resin composition (II) in an arbitrary order to such an extent that does not deteriorate the properties of the resin layer to be formed by the resulting resin composition. The mixing and stirring can be carried out by shaking the container by hand, using a magnetic stirrer or a stirring blade, ultrasonic irradiation or vibrational dispersion.

(9) Coating Method

As a method of coating the resin composition (II) on a thermoplastic resin film, any known coating method, such as bar coating, reverse coating, gravure coating, die coating or blade coating, can be employed.

The laminated film obtained in the above-described manner can be used as a polarizing plate by laminating it with a PVA sheet prepared by incorporating iodine into a commercially available PVA and imparting the resultant with orientation. The laminated sheet can also be laminated with an EVA sheet, and the resultant can be preferably used as a backsheet for solar cells. Furthermore, by preparing a laminated glass having a constitution of a glass—a PVB sheet—the laminated film—a PVB sheet—a glass, the laminated film can be preferably used in a heat-shielding glass.

(Property Measurement Methods and Effect Evaluation Methods)

In the present invention, the properties were measured and the effects were evaluated by the methods described below.

(1) Layer Thickness, Number of Laminated Layers and Laminate Structure

The layer constitution of the subject film was determined by observing a cross-section of a sample of the film, which was cut out using a microtome, under a transmission electron microscope (TEM). That is, a cross-section of the subject film was observed under a transmission electron microscope H-7100FA (manufactured by Hitachi, Ltd.) with an acceleration voltage of 75 kV, and a photograph of the cross-section was taken to determine the layer constitution and the thickness of each layer. It is noted here that, depending on the case, a staining technique using $RuO_4$, $OsO_4$ or the like was employed so as to attain high contrast.

In accordance with the thickness of a layer having the smallest thickness (thin-film layer) among all layers photographed in a single image, the observation was carried out at a magnification of ×100,000 when the thickness of the thin-film layer was less than 50 nm, at a magnification of ×40,000 when the thickness of the thin-film layer was 50 nm to less than 500 nm, or at a magnification of ×10,000 when the thickness of the thin-film layer was 500 nm or greater.

(2) Method of Calculating Layer Thickness

The TEM image thus obtained in the above (1) was captured as a 720-dpi image using Canon Scan D123U. The image was saved in a personal computer as a bitmap file (BMP) or a compressed image file (JPEG). Then, this image file was opened with an image processing software (Image-Pro Plus ver.4, commercially available from Planetron Co., Ltd.) and subjected to image analysis. For this image analysis, in the vertical thick profile mode, the relationship between a position in the thickness direction and the average brightness of a region between two lines drawn in the width direction was read out as numerical data. Then, using a spreadsheet software (Excel 2000), after subjecting the thus obtained data of position (nm) and brightness to the sampling step 6 (pixel skipping 6), the resulting data were further subjected to numerical processing of three-point moving average. Further, the thus obtained data with periodically changing brightness was differentiated and, using VBA (Visual Basic for Applications) program, the maximum and minimum values of the resulting differential curve were identified and the thickness of each layer was calculated, taking an interval between adjacent values as the thickness of a single layer. These operations were performed for each image to determine the thicknesses of all layers.

(3) Conformation of Structure of Resin Composition (I) Forming Resin Layer ($\alpha$)

(Confirmation of Aliphatic Urethane Structure and Structures of Formulae (1) to (5))

The method of confirming the structure of the resin composition (I) forming the resin layer ($\alpha$) (confirmation of the aliphatic urethane structure and the structures of the Formulae (1) to (5)) is not particularly restricted; however, the following method can be exemplified. For example, for the aliphatic urethane structure, weight peaks derived from an aliphatic isocyanate compound and a polyol compound that are generated by cutting an urethane linkage are verified by gas chromatography-mass spectroscopy (GC-MS). For the structures of the Formulae (1) to (5), the presence or absence of a weight peak derived from each structure is verified in the same manner. Next, by Fourier-transform infrared spectroscopy (FT-IR), the presence or absence of peaks derived from bonds between the respective atoms contained in the aliphatic isocyanate compound, polyol compound and structures of the Formulae (1) to (5) is verified. Further, the positions of chemical shifts derived from the positions of hydrogen atoms contained in the aliphatic isocyanate compound, polyol compound and structures of the Formulae (1) to (5) as well as the proton-absorption line area attributed to the number of hydrogen atoms are verified by proton-nuclear magnetic resonance spectroscopy (1H-NMR). A method which comprehensively confirms the structures based on these results is preferably employed.

The above-described analyses are performed for samples cut out from the resin composition (I) using a blade knife. The structure of the acrylic-modified polyester resin (A) can also be confirmed in the same manner.

(4) Methods of Calculating Surface Free Energy and Polarity Force

First, the subject laminated film is left to stand for 24 hours in an atmosphere having a room temperature of 23° C. and a relative humidity of 65%. Then, in the same atmosphere, the contact angles of four solutions (pure water, ethylene glycol, formamide and diiodomethane) against the resin layer ($\alpha$) are each measured using a contact angle meter CA-D (manufactured by Kyowa Interface Science Co., Ltd.) at five points. The average value of three measurements, excluding the maximum and minimum values from the measurements taken at the five points, is defined as the contact angle of each solution.

Next, using the thus obtained contact angles of the four solutions, the dispersion force, the polar force and the surface free energy, which is a sum of the dispersion force and the polar force, of the present invention are calculated by a geometric mean method based on "Equation Extended from Fowkes Equation with Separation of Surface Free Energy of Solid ($\gamma$) into Three Components—Dispersion Force Component ($\gamma_S^d$), Polar Force Component ($\gamma_S^p$) and Hydrogen Bonding Component ($\gamma_S^h$) (Extended Fowkes Equation)", which was proposed by Hata et al.

A concrete calculation method is described below along with the meanings of the respective symbols. When $\gamma_S^L$ represents a tension at an interface between a solid and a liquid, the following equation (4) is established.

$\gamma_S^L$: Surface free energy of a resin layer and a known solution shown in Table 1

$\gamma_S$: Surface free energy of the resin layer $\gamma_L$: Surface free energy of the known solution shown in Table 1

$\gamma_S^d$: Dispersion force component of the surface free energy of the resin layer $\gamma_S^p$: Polar force component of the surface free energy of the resin layer $\gamma_S^h$: Hydrogen bonding component of the surface free energy of the resin layer $\gamma_L^d$: Dispersion force component of the surface free energy of the known solution shown in Table 1

$\gamma_L^p$: Polar force component of the surface free energy of the known solution shown in Table 1

$\gamma_L^h$: Hydrogen bonding component of the surface free energy of the known solution shown in Table 1

$$\gamma_S^L = \gamma_S + \gamma_L - 2(\gamma_S^d \cdot \gamma_L^d)^{1/2} - 2(\gamma_S^p \cdot \gamma_L^p)^{1/2} - 2(\gamma_S^h \cdot \gamma_L^h)^{1/2} \quad (4)$$

A state in which a liquid droplet is in contact with a smooth solid surface at a contact angle (θ) is expressed by the following equation:

$$\gamma_S = \gamma_S^L + \gamma_L \cos\theta \quad (5)$$

The following equation is obtained by combining these equations (4) and (5):

$$(\gamma_S^d \cdot \gamma_L^d)^{1/2} + (\gamma_S^p \cdot \gamma_L^p)^{1/2} + (\gamma_S^h \cdot \gamma_L^h)^{1/2} = \gamma_L(1+\cos\theta)/2 \quad (6)$$

Actually, the contact angles (θ) of four solutions (water, ethylene glycol, formamide and diiodomethane) and the values of the respective surface tension components ($\gamma_L^d$, $\gamma_L^p$ and $\gamma_L^h$) of each known solution shown in Table 1 are substituted into the equation (6), and the resulting four simultaneous equations are solved. As a result, the solid surface free energy (γ), the dispersion force component ($\gamma_S^d$), the polar force component ($\gamma_S^p$) and the hydrogen bonding component ($\gamma_S^h$) are determined. Here, the dispersion force of the present invention corresponds to the dispersion force component ($\gamma_S^d$) and the polar force of the present invention corresponds to a sum of the polar force component ($\gamma_S^p$) and the hydrogen bonding component ($\gamma_S^h$).

(5) Evaluation of Adhesiveness

The adhesiveness to PVA was tested by the following method.

First, PVAs having different saponification degrees were each dissolved in water to prepare four PVA solutions having a solid concentration of 5%. The PVAs used to prepare the four PVA solutions are listed below.

PVAa: completely saponified PVA (saponification degree: 98 to 99 mol %) "PVA-117" (manufactured by Kuraray Co., Ltd.)

PVAb: semi-completely saponified PVA (saponification degree: 91 to 94 mol %) "AL-06" (manufactured by The Nippon Synthetic Chemical Industry Co., Ltd.)

PVAc: acetyl group-modified PVA (saponification degree: 92 to 94 mol %) "Z-320" (manufactured by The Nippon Synthetic Chemical Industry Co., Ltd.)

PVAd: partially saponified PVA (saponification degree: 78 to 82 mol %) "KL-06" (manufactured by The Nippon Synthetic Chemical Industry Co., Ltd.)

Next, the four PVA solutions are each coated on the resin layer (α) of the subject laminated film using a bar coater (manufactured by Matsuo Sangyo Co., Ltd., bar number: 4, wet thickness: about 8 μm) and subsequently dried at 100° C. for 1 minute in a hot-air oven "High-Temp-Oven PHH-200" (manufactured by Espec Corp.) to obtain four films for evaluation of adhesiveness. In accordance with JIS 5600-5-6 (1999), 25 cells (5×5 cells) are cut on each of the thus obtained samples for evaluation of adhesiveness at cutting intervals of 2 mm. Then, an 18-mm CELLOTAPE (registered trademark) manufactured by Nichiban Co., Ltd. (product number: CT-18S) is pasted over the part of the cut cells and firmly rubbed with a finger such that the cut cells are visible. Thereafter, the CELLOTAPE (registered trademark) is instantaneously peeled off at an angle of about 60° with respect to the resin layer. The number of detached cells is counted. This evaluation is repeated five times and an average thereof is determined. The evaluation criteria are defined as follows. The evaluation criteria "A" and "B" are judged to represent good adhesiveness.

A: The number of detached cells is 1 or less.
B: The number of detached cells is 3 or less.
C: The number of detached cells is 4 to 5.
D: The number of detached cells is 6 or more.

The adhesiveness to EVA and PVB sheets was tested by the following method.

Using a lamination apparatus (Lamipacker LPP650, manufactured by Fuji Plastic Machinery Co., Ltd.), the below-described interlayer sheets are each laminated on the resin layer (α) of the subject laminated film by passing them through rolls heated at 100° C., thereby obtaining films for evaluation of adhesiveness. It is noted here that, in this process, the roll speed is set at 600 mm/min and the roll gap is set at minimum.

PVB: "S-LEC film HI", manufactured by Sekisui Chemical Co., Ltd.

EVAa: "SOARNOL DT2904" (saponification degree: 71 mol %), manufactured by The Nippon Synthetic Chemical Industry Co., Ltd.

EVAb: "SOARNOL DC3203" (saponification degree: 68 mol %), manufactured by The Nippon Synthetic Chemical Industry Co., Ltd.

EVAc: "SOARNOL ET3803" (saponification degree: 62 mol %), manufactured by The Nippon Synthetic Chemical Industry Co., Ltd.

EVAd: "SOARNOL AT4403" (saponification degree: 56 mol %), manufactured by The Nippon Synthetic Chemical Industry Co., Ltd.

For the thus obtained five films for evaluation of adhesiveness, using a precision universal tester Autograph "AG-IS" (manufactured by Shimadzu Corporation), the peel force (N/mm) in the 90° direction is measured in the peel mode at a peeling rate of 50 mm/min. The test is performed at a gauge length of 80 mm and a width of 5 mm, and the average value of the load applied over a length of 20 to 70 mm is divided by the measurement width to determine the peeling strength (N/mm). The test is repeated five times and an average thereof is determined. The evaluation criteria are defined as follows. The evaluation criteria "A" and "B" are judged to represent good adhesiveness.

A: peeling strength=0.15 N/mm or higher
B: peeling strength=0.10 N/mm to less than 0.15 N/mm
C: peeling strength=0.05 N/mm to less than 0.10 N/mm
D: peeling strength=less than 0.05 N/mm (6) Evaluation of Moist Heat-Resistant Adhesiveness Four films for evaluation of adhesiveness were obtained in the same manner as in the above (5). Then, these films for evaluation of adhesiveness were left to stand for 10 days (240 hours) in a thermo-hygrostat chamber (LU-113, manufactured by Espec Corp.) set at 60° C. and 95% RH. Thereafter, the samples were taken out of the thermo-hygrostat chamber and then left to stand and dried for 1 hour in a normal state (23° C., relative humidity: 50%). Subsequently, the samples were subjected to evaluation of adhesiveness in the same manner as in the above (5). The evaluation criteria were also the same as in the above (5) and the evaluation criteria "A" and "B" were judged to represent good adhesiveness.

(7) Retardation and Orientation Angle

A phase contrast analyzer manufactured by Oji Scientific Instruments Ltd. (KOBRA-21ADH) was used. A sample having a size of 3.5 cm×3.5 cm was cut out from the central portion of the subject film in the width direction and set in the analyzer such that the film width direction was arranged at an angle of 0° as defined by the measuring apparatus. At an incidence angle of 0°, the retardation of light having a wavelength of 590 nm and its orientation angle were measured.

(8) Visibility Test

On one side of a polarizing plate having a polarization degree of 99.9% which was prepared by adsorbing and orienting iodine in a PVA, a sample, which was cut out from the central portion of the subject film in the width direction at a size of 420 mm in the width direction and 310 mm in the longitudinal direction, was laminated to prepare a test piece. The thus obtained test piece and a polarizing plate without the subject film being laminated thereon were superimposed in a cross-Nicol arrangement on an LED light source (A3-101, manufactured by Tritek Co., Ltd.) to verify the visibility.

⊚: Hardly any interference color was observed.

○: A slight interference color was observed but it presented no practical problem.

x: An interference color was clearly observed—not suitable for display application because it makes images unclear.

(9) 10-Point Average Roughness (Rz)

Using a three-dimensional surface profile analyzer ET-4000AK (manufactured by Kosaka Laboratory Ltd.), the surface profile of the subject laminated film was measured, and the 10-point average roughness was determined in accordance with the method described in JIS B 0601-1994.

(11) Glass Transition Temperature of Resin Layer (α)

For example, the temperature at an intersection between a straight line drawn at an equal distance from the straight lines extended from each of the baselines on the low-temperature and high-temperature sides in the ordinate direction and the curve of the stepwise glass transition period, which temperature was measured and calculated by differential scanning calorimetry (DSC) in accordance with JIS-K-7122 (1987), was defined as the glass transition temperature. A sample scraped from the subject resin layer (α) using a blade knife was packed into an aluminum pan and heated from −100° C. to 200° C. at a rate of 20° C./min.

Apparatus: "Robot DSC-RDC220", manufactured by Seiko Instruments Inc.

Data analysis: "Disk Session SSC/5200"

Sample mass: 5 mg

EXAMPLES

Example 1

Acrylic-Modified Polyester Resin (A) and Coating Solution Containing (A):

For preparation of a polyester resin component, 50 parts by mass of terephthalic acid, 50 parts by mass of isophthalic acid, 50 parts by mass of ethylene glycol and 30 parts by mass of neopentyl glycol were loaded to a nitrogen-purged reaction vessel along with polymerization catalysts, which were 0.3 parts by mass of antimony trioxide and 0.3 parts by mass of zinc acetate. The loaded materials were allowed to undergo polymerization reaction for 12 hours under normal pressure at 190 to 220° C. while removing water, thereby obtaining a polyester glycol. Then, 5 parts by mass of 5-sodium sulfoisophthalic acid and, as a solvent, xylene were added to the thus obtained polyester glycol in the reaction vessel, and the resulting mixture was allowed to polymerize for 3 hours under a reduced pressure of 0.2 mmHg at 260° C. while distilling off xylene, thereby obtaining a polyester resin component. This polyester resin component was dissolved in water containing aqueous ammonia and butyl cellulose.

Next, for preparation of an acrylic resin component, 40 parts by mass of methyl methacrylate and 10 parts by mass of methacrylamide in a total of 50 parts by mass were added to the above-described polyester resin component-containing water dispersion at a mass ratio (acrylic resin component/the polyester resin component) of 50/50. As a polymerization initiator, 5 parts by mass of benzoyl peroxide was further added, and the resulting mixture was allowed to undergo polymerization reaction for 3 hours at 70 to 80° C. in a nitrogen-purged reaction vessel, thereby obtaining a coating solution containing an acrylic-modified polyester (A) (in Tables below, this is abbreviated as "Acryl (iii)").

Aliphatic Urethane Resin (B) and Coating Solution Containing (B):

To a four-necked flask equipped with a reflux condenser, a nitrogen-introducing tube, a thermometer and a stirrer, 70 parts by mass of 1,6-hexane diisocyanate as an aliphatic polyisocyanate compound, 30 parts by mass of polyisobutylene glycol as a polyol compound, and 60 parts by mass of acetonitrile and 30 parts by mass of N-methylpyrrolidone as solvents were loaded. Then, under a nitrogen atmosphere, the reaction solution temperature was adjusted to 75 to 78° C., 0.06 parts by mass of stannous octoate was added as a reaction catalyst and the resulting mixture was allowed to react for 7 hours. The resultant was cooled to 30° C. to obtain an isocyanate group-terminated aliphatic urethane resin (B). Next, water was added to a reaction vessel equipped with a homodisper capable of performing high-speed stirring, and the temperature was adjusted to 25° C. Under stirring at 2,000 rpm, the thus obtained isocyanate group-terminated aliphatic urethane resin (B) was added and dispersed in water. Thereafter, by partially removing acetonitrile and water under reduced pressure, a coating solution containing the aliphatic urethane resin (B) was prepared (in Tables below, this is abbreviated as "Aliphatic (i)").

Resin Composition (II):

The thus obtained coating solution containing the acrylic-modified polyester resin (A) and the coating solution containing the aliphatic urethane resin (B) were mixed such that the resulting mixture contained 90 parts by mass of the acrylic-modified polyester resin (A) and 10 parts by mass of the aliphatic urethane resin (B). To this mixture, in order to impart the resulting resin layer surface with lubricity, silica particles having a number-average particle size of 170 nm (SNOWTEX (registered trademark) MP-2040, manufactured by Nissan Chemical Industries, Ltd.) were added as inorganic particles in an amount of 2 parts by mass with respect to a total of 100 parts by mass of the acrylic-modified polyester resin (A) (80 parts by mass) and the aliphatic urethane resin (B) (20 parts by mass). Further, in order to improve the coating properties of the resulting resin composition (II) on a polyester film, a fluorine-containing surfactant (PLAS COAT (registered trademark) RY-2, manufactured by GOO Chemical Co., Ltd.) was added in an amount of 0.03 parts by mass with respect to 100 parts by mass of the resin composition (II). By the above-described preparation operations, the resin composition (II) was obtained.

Laminated Film:

As a thermoplastic resin, polyethylene terephthalate (PET) having a melting point of 258° C. was used. This PET was loaded to two uniaxial extruders and melt-kneaded at 280° C. Then, after allowing the PET to pass through five FSS-type leaf disk filters in each uniaxial extruder, the PET was fed to a die while measuring the amount thereof using a gear pump, thereby obtaining an unstretched PET film. In this process, the inside of the die had a widening ratio, which is a value obtained by dividing the length 17 of the die lip in the film width direction by the length 15 of the die in the film width direction at the inlet port, of 2.5.

The thus obtained cast film was heated with a group of rolls whose temperature was set at 75° C. Then, in a stretching section of 100 mm in length, while rapidly heating the film from both sides using radiation heaters, the film was stretched in the longitudinal direction at a draw ratio of 3.6 and subsequently cooled once.

Next, both sides of the resulting uniaxially-stretched film were subjected to corona discharge treatment in the air so as to adjust the thermoplastic resin film to have a wetting tension of 55 mN/m. On the thus treated surfaces, the resin composition (II) was coated using a bar coater at a coating thickness of about 6 μm.

This uniaxially-stretched film was introduced to a tenter and, after pre-heating the film with hot air at 100° C., the film was stretched in the width direction at a temperature of 110° C. and a draw ratio of 3.6. In this process, the stretching speed and the temperature were both constant. The thus stretched film was heat-treated with hot air at 240° C. in the same tenter and subsequently subjected to a 2% relaxation treatment in the width direction at the same temperature. Further, after rapidly cooling the resulting film to 100° C., the film was subjected to a 5% relaxation treatment in the width direction and then rolled up to obtain a laminated film.

With regard to the structure of the resin composition (I) forming a resin layer (α) of the laminated film, the presence of a weight peak attributed to the structure of the Formula (3) was confirmed by gas chromatography-mass spectrometry (GC-MS). Then, by Fourier-transform infrared spectroscopy (FT-IR), the presence of peaks attributed to the bonds formed between the atoms contained in the structure of the Formula (3) was confirmed. Lastly, by proton nuclear magnetic resonance spectroscopy (1H-NMR), the positions of chemical shifts attributed to the positions of hydrogen atoms contained in the structure of the Formula (3) as well as the number of hydrogen atoms determined from the proton-absorption line area were confirmed. By putting these results together, it was confirmed that the resin layer (α)-forming resin composition (I) contained the structure of the Formula (3).

The thus obtained film exhibited the physical properties as shown in Tables 4 and 7 and had a surface free energy of 32 mN/m and a polar force of 8 mN/m. The film showed good adhesiveness, with its adhesiveness to PVAa to d, EVAa to d and PVB and moist heat-resistant adhesiveness being all evaluated as "A" or "B".

Meanwhile, the laminated film of Example 1 showed a large change in retardation in the film width direction and was observed with prominent coloration.

Examples 2 to 4

Films were obtained in the same manner as in Example 1, except that the mass ratio of the acrylic-modified polyester resin (A) and the aliphatic urethane resin (B) in the resin composition (II) was changed as shown in Table 2. The thus obtained films exhibited the physical properties as shown in Table 4. Since the mass of the aliphatic urethane resin (B) was increased as compared to Example 1, the resin layer (α) had an increased polar force; however, good results were obtained in both evaluations of the adhesiveness and the moist heat-resistant adhesiveness.

Examples 5 to 8

An aliphatic urethane resin (B) (in Tables below, this is abbreviated as "Alicyclic (i)") and a coating solution containing (B) were prepared in the same manner as in Example 1, except that isophorone diisocyanate was used as the aliphatic polyisocyanate compound. Films of Examples 5 and 8 were obtained in the same manner as in Examples 1 to 4, following the respective mass ratios shown in the section "Resin composition" in Table 2. The thus obtained films exhibited the physical properties as shown in Table 4. By changing the aliphatic urethane structure in the resin layer (α)-forming resin composition (I) of Example 1 to an alicyclic urethane structure, superior results were obtained in both evaluations of the adhesiveness and the moist heat-resistant adhesiveness as compared to Examples 1 to 4.

Example 9

An aliphatic urethane resin (B) (in Table below, this is abbreviated as "Alicyclic (ii)") and a coating solution containing (B) were prepared and a film was obtained in the same manner as in Example 6, except that hydrogenated xylylene diisocyanate was used as the aliphatic polyisocyanate compound. The thus obtained films exhibited the physical properties as shown in Table 4. As compared to Example 6, the laminated film of Example 9, in which the resin layer (α)-forming resin composition (I) contained an alicyclic urethane structure, yielded superior results in both evaluations of the adhesiveness and the moist heat-resistant adhesiveness.

Example 10

A film was obtained in the same manner as in Example 6, except that the acrylic resin component of the acrylic-modified polyester resin (A) (in Table below, this is abbreviated as "Acryl (i)") was prepared using 40 parts by mass of methyl methacrylate and 10 parts by mass of 2-hydroxyethyl methacrylate in a total of 50 parts by mass. The thus obtained film exhibited the physical properties as shown in Table 4. In comparison to Example 6, when the structure of the resin layer (α)-forming resin composition (I) of the laminated film was checked in the same manner as in Example 1, it was confirmed that the resin composition (I) had the structure of the Formula (1). This laminated film of Example 10, in which the resin layer (α)-forming resin composition (I) had the structure of the Formula (1), yielded superior results in both evaluations of the adhesiveness and the moist heat-resistant adhesiveness.

Example 11

A film was obtained in the same manner as in Example 6, except that the acrylic resin component of the acrylic-modified polyester resin (A) (in Table below, this is abbreviated as "Acryl (ii)") was prepared using 40 parts by mass of methyl methacrylate and 10 parts by mass of ethylene glycol methacrylate in a total of 50 parts by mass. The thus obtained film exhibited the physical properties as shown in Table 4. In comparison to Example 6, when the structure of the resin layer (α)-forming resin composition (I) of the laminated film was checked in the same manner as in Example 1, it was confirmed that the resin composition (I) had the structure of the Formula (2). This laminated film of Example 11, in which the resin layer (α)-forming resin composition (I) had the structure of the Formula (2), yielded superior results in both evaluations of the adhesiveness and the moist heat-resistant adhesiveness.

Example 12

A film was obtained in the same manner as in Example 6, except that the acrylic resin component of the acrylic-modified polyester resin (A) (in Table below, this is abbreviated as "Acryl (iv)") was prepared using 40 parts by mass of methyl methacrylate and 10 parts by mass of triethylamine acrylate in a total of 50 parts by mass. The thus obtained film exhibited the physical properties as shown in Table 4. In comparison to Example 6, when the structure of the resin layer (α)-forming resin composition (I) of the laminated film was checked in the same manner as in Example 1, it was confirmed that the resin composition (I) had the structure of the Formula (4). This laminated film of Example 12, in which the resin layer (α)-forming resin composition (I) had the structure of the Formula (4), yielded superior results in both evaluations of the adhesiveness and the moist heat-resistant adhesiveness.

Example 13

A film was obtained in the same manner as in Example 6, except that the acrylic resin component of the acrylic-modified polyester resin (A) (in Table below, this is abbreviated as "Acryl (v)") was prepared using 40 parts by mass of methyl methacrylate and 10 parts by mass of glycidyl acrylate in a total of 50 parts by mass. The thus obtained film exhibited the physical properties as shown in Table 4. In comparison to Example 6, when the structure of the resin layer (α)-forming resin composition (I) of the laminated film was checked in the same manner as in Example 1, it was confirmed that the resin composition (I) had the structure of the Formula (5). This laminated film of Example 13, in which the resin layer (α)-forming resin composition (I) had the structure of the Formula (5), yielded superior results in both evaluations of the adhesiveness and the moist heat-resistant adhesiveness.

Examples 14 and 15

Film were obtained in the same manner as in Example 6 except that, in addition to the acrylic-modified polyester resin (A) and aliphatic urethane resin (B) in the resin composition (II), CARBODILITE (registered trademark) V-04 (manufactured by Nisshinbo Chemical Inc.) was added as a carbodiimide compound (C) at the respective mass ratios shown in Table 2. The thus obtained films exhibited the physical properties as shown in Table 4. As compared to Example 6, these laminated films of Examples 14 and 15, in which the resin layer (α)-forming resin composition (I) contained the structure of the carbodiimide compound (C), yielded superior results in both evaluations of the adhesiveness and the moist heat-resistant adhesiveness.

Example 16

A film was obtained in the same manner as in Example 6 except that, in addition to the acrylic-modified polyester resin (A) and aliphatic urethane resin (B) in the resin composition (II), NIKALAC (registered trademark) MW-035 (manufactured by Sanwa Chemical Co., Ltd.) was added as a melamine compound (C) at the mass ratio shown in Table 3. The thus obtained film exhibited the physical properties as shown in Table 5. As compared to Example 6, the laminated film of Example 16, in which the resin layer (0-forming resin composition (I) contained the structure of the melamine compound (C), yielded superior results in both evaluations of the adhesiveness and the moist heat-resistant adhesiveness.

Example 17

A laminated film was obtained in the same manner as in Example 6 except that, in addition to the acrylic-modified polyester resin (A) and aliphatic urethane resin (B) in the resin composition (II), NIKALAC (registered trademark) MW-12LF (manufactured by Sanwa Chemical Co., Ltd.) was added as a melamine compound (C) at the mass ratio shown in Table 3. The properties and the like of the thus obtained laminated film are shown in Table 5. As compared to Example 6, the laminated film of Example 17, in which the resin layer (α)-forming resin composition (I) contained the structure of the melamine compound (C), yielded superior results in both evaluations of the adhesiveness and the moist heat-resistant adhesiveness.

Examples 18 to 21

Laminated films were obtained in the same manner as in Example 6 except that, in addition to the acrylic-modified polyester resin (A) and aliphatic urethane resin (B) in the resin composition (II), NIKALAC (registered trademark) MW-12LF (manufactured by Sanwa Chemical Co., Ltd.) was added as a melamine compound (C) at the respective mass ratios shown in Table 3. The properties and the like of the thus obtained laminated films are shown in Table 5. As compared to Example 6, these laminated films of Examples 18 to 21, in which the resin layer (α)-forming resin composition (I) contained the structure of the melamine compound (C), yielded superior results in both evaluations of the adhesiveness and the moist heat-resistant adhesiveness.

Example 22

An aliphatic urethane resin (B) and a coating solution containing (B) were prepared in the same manner as in Example 6, except that hydrogenated xylylene diisocyanate was used as the aliphatic polyisocyanate compound. Then, a laminated film was obtained in the same manner as in Example 18. The thus obtained laminated film exhibited the physical properties as shown in Table 5. As compared to Example 18, the laminated film of Example 22, in which the resin layer (α)-forming resin composition (I) had an alicyclic urethane structure, yielded superior results in both evaluations of the adhesiveness and the moist heat-resistant adhesiveness.

Example 23

A laminated film was obtained in the same manner as in Example 6 except that, in addition to the acrylic-modified polyester resin (A) and aliphatic urethane resin (B) in the resin composition (II), a carbodiimide compound, CARBODILITE (registered trademark) V-04, as well as a melamine compound, NIKALAC (registered trademark) MW-12LF, were added as compounds (C) at the respective mass ratios shown in Table 3. The thus obtained laminated film exhibited the physical properties as shown in Table 5. As compared to Example 6, the laminated film of Example 23, in which the resin layer (α)-forming resin composition (I) contained the structure of the melamine compound (C), yielded superior results in the evaluations of the adhesiveness to PVAa to d and the moist heat-resistant adhesiveness.

Example 24

A laminated film was obtained in the same manner as in Example 1, except that ELASTRON E-37, which is a polyester-urethane copolymer, was used in place of the acrylic-modified polyester resin (A) and the aliphatic urethane resin (B) in the resin composition (II). The thus obtained laminated film exhibited the physical properties as shown in Table 5. As compared to Example 1, the laminated film of Example 24, in which the surface irregularities were smoother reflecting the high uniformity of the polyester resin and the urethane resin in the resin layer (α)-forming resin composition (I), yielded slightly inferior results in the evaluations of the adhesiveness to PVAa to d and the moist heat-resistant adhesiveness.

Example 25

A laminated film was obtained in the same manner as in Example 1, except that ELASTRON H-3, which is a polyester-urethane copolymer, was used in place of the acrylic-modified polyester resin (A) and the aliphatic urethane resin (B) in the resin composition (II). The thus obtained laminated film exhibited the physical properties as shown in Table 5. As compared to Example 1, the laminated film of Example 25, in which the surface irregularities were smoother reflecting the high uniformity of the polyester resin and the urethane resin in the resin layer (α)-forming resin composition (I), yielded slightly inferior results in the evaluations of the adhesiveness to PVAa to d and the moist heat-resistant adhesiveness.

Comparative Example 1

An aliphatic urethane resin (B) and a coating solution containing (B) were prepared and a film was obtained in the same manner as in Example 2, except that tolylene diisocyanate was used as an aromatic polyisocyanate compound (in Table below, this is abbreviated as "Aromatic (i)") in place of the aliphatic polyisocyanate compound. The thus obtained film exhibited the physical properties as shown in Table 5. As compared to Example 2, the laminated film of Comparative Example 1, in which the aliphatic urethane structure in the resin layer (α)-forming resin composition (I) was changed to an aromatic urethane structure, yielded inferior results in the evaluations of the adhesiveness as well as the moist heat-resistant adhesiveness.

Comparative Example 2

A film was obtained in the same manner as in Example 2, except that the mass ratio of the acrylic-modified polyester resin (A) and the aliphatic urethane resin (B) in the resin composition (II) was changed as shown in Table 3 and 18% by mass of REZEM (registered trademark) N-137 (manufactured by Chukyo Yushi Co., Ltd.) was further added as a long-chain alkyl-containing surface treatment agent. The thus obtained film exhibited the physical properties as shown in Table 5. Meanwhile, for this film, the evaluation of the adhesiveness, the evaluation of the moist heat-resistant adhesiveness and the visibility test could not be performed because the resin layer had a surface free energy of less than 30 mN/m and this caused delamination of PVA during lamination.

Comparative Example 3

A film was obtained in the same manner as in Example 2, except that the acrylic resin component and the polyester resin component were added at a mass ratio (acrylic resin component/polyester resin component) of 8/92. The thus obtained film exhibited the physical properties as shown in Table 5. Since the resin layer had a surface free energy of greater than 45 mN/m, as compared to Example 2, the film of Comparative Example 3 yielded inferior results particularly in the adhesiveness to PVA having a low saponification degree and the moist heat-resistant adhesiveness.

Comparative Example 4

A film was obtained in the same manner as in Example 1, except that the acrylic resin component of the acrylic-modified polyester resin (A) (in Table below, this is abbreviated as "Aromatic (vi)") was changed to 50 parts by mass of methyl methacrylate. The thus obtained film exhibited the physical properties as shown in Table 5. Since the resin layer contained no polar group and thus had a polar force of less than 5 mN/m, as compared to Example 1, the film of Comparative Example 4 yielded inferior results particularly in the adhesiveness to PVA having a high saponification degree and the moist heat-resistant adhesiveness.

Comparative Example 5

A film was obtained in the same manner as in Example 2 except that, in addition to 82% by mass of the acrylic-modified polyester resin (A) and aliphatic urethane resin (B) contained in the resin composition (II), 17% by mass of a completely saponified PVA used as the PVAa, "PVA-117" (saponification degree: 98 to 99 mol %), was added. The thus obtained film exhibited the physical properties as shown in Table 5. As compared to Example 2, the laminated film of Comparative Example 5, in which the resin layer (α)-forming resin composition (I) contained the structure of the PVA, showed superior adhesiveness; however, since the PVA in the resin layer (α) was swollen, the laminated film of Comparative Example 5 yielded a largely inferior result in the evaluation of the moist heat-resistant adhesiveness as compared to Example 2.

Example 26

The film of Example 26 was obtained in the same manner as in Example 1, except that a laminated film was prepared in the following manner.

As the thermoplastic resin A, a polyethylene terephthalate (PET) having a melting point of 258° C. was used. Further, as the thermoplastic resin B, ethylene terephthalate copolymerized with 25 mol % of spiroglycol, which is an amorphous resin having no melting point, and 30 mol % of cyclohexanedicarboxylic acid (PE/SPG·T/CHDC) was used. The thus prepared crystalline polyester and thermoplastic resin B were each loaded to two uniaxial extruders and melt-kneaded at 280° C. Then, the thus melt-kneaded crystalline polyester and thermoplastic resin B were each passed through five FSS-type leaf disk filters and subsequently merged in a lamination apparatus having 51 slits while measuring their amounts using a gear pump, so as to prepare a laminate in which the crystalline polyester and the thermoplastic resin B were alternately laminated in 51 layers in the thickness direction. This laminate was prepared in accordance with the method described in the paragraphs [0053] to [0063] of JP-A No. 2007-307893. In this process, all of the slits had the same length and the gaps between the slits were all constant. The thus obtained laminate had a laminated structure in which 26 layers of the crystalline polyester and 25 layers of the thermoplastic resin B were alternately laminated in the thickness direction. Further, the inside of the die had a widening ratio, which is a value obtained by dividing the length 17 of the die lip in the film width direction by the length 15 of the die in the film width direction at the inlet port, of 2.5.

The thus obtained cast film was heated with a group of rolls whose temperature was set at 75° C. Then, in a stretching section of 100 mm in length, while rapidly heating the film from both sides using radiation heaters, the film was stretched in the longitudinal direction at a draw ratio of 3.6 and subsequently cooled once.

Next, both sides of the resulting uniaxially-stretched film were subjected to corona discharge treatment in the air so as to adjust the substrate film (laminated film) to have a wetting tension of 55 mN/m. On the thus treated surfaces, the resin composition (II) was coated using a bar coater at a coating thickness of about 6 μm.

This uniaxially-stretched film was introduced to a tenter and, after pre-heating the film with hot air at 100° C., the film was stretched in the width direction at a temperature of 110° C. and a draw ratio of 3.6. In this process, the stretching speed and the temperature were both constant. The thus stretched film was heat-treated with hot air at 240° C. in the same tenter and subsequently subjected to a 2% relaxation treatment in the width direction at the same temperature. Further, after rapidly cooling the resulting film to 100° C., the film was subjected to a 5% relaxation treatment in the width direction and then rolled up to obtain a laminated film.

The thus obtained film exhibited the physical properties as shown in Table 6, and the adhesiveness to PVA and the moist heat-resistant adhesiveness were comparable to those of the film of Example 1. Meanwhile, as compared to Example 1, the variation of the retardation in the film width direction was improved and, the film of Example 26 also showed improved coloration and brightness in an environment similar to the one where the film is actually mounted on a liquid crystal display.

Example 27

A film was obtained in the same manner as in Example 26, except that the stretching temperature in the film width direction was changed to 110° C. in the first half of the stretching section and to 150° C. in the second half of the stretching section. The thus obtained film exhibited the physical properties as shown in Table 6, and the adhesiveness to PVA and the moist heat-resistant adhesiveness were comparable to those of the film of Example 26. Meanwhile, as compared to Example 1, the uniformity of the orientation angle in the film width direction was improved, and the film of Example 27 also showed improved coloration and brightness in an environment similar to the one where the film is actually mounted on a liquid crystal display.

Example 28

A film was obtained in the same manner as in Example 18, except that the stretching speed in the film width direction was adjusted such that the film was stretched to 70% of its maximum stretching amount in the first half of the stretching section. The thus obtained film exhibited the physical properties as shown in Table 6, and the adhesiveness to PVA and the moist heat-resistant adhesiveness were comparable to those of the film of Example 18. Meanwhile, as compared to Example 18, the uniformity of the orientation angle in the film width direction was further improved, and the film of Example 28 also showed good coloration and brightness in an environment similar to the one where the film is actually mounted on a liquid crystal display.

Example 29

A film was obtained in the same manner as in Example 26, except that the lamination apparatus was changed to one having 5 slits. The thus obtained film exhibited the physical properties as shown in Table 6, and the adhesiveness to PVA and the moist heat-resistant adhesiveness were comparable to those of the film of Example 26. On the other hand, as compared to Example 26, the retardation tended to be slightly increased.

Example 30

A film was obtained in the same manner as in Example 26, except that a three-layer laminated film was prepared using other lamination apparatus capable of producing a three-layer structure of "thermoplastic resin A/thermoplastic resin B/thermoplastic resin A" in place of the lamination apparatus used in Example 26. The thus obtained film exhibited the physical properties as shown in Table 6, and the adhesiveness to PVA and the moist heat-resistant adhesiveness were comparable to those of the film of Example 26. On the other hand, as compared to Example 26, the retardation was worse, and the film of Example 30 showed somewhat noticeable coloration in an environment similar to the one where the film is actually mounted on a liquid crystal display. In addition, since the film-forming stability was poor and a high yield can thus not be expected, it is difficult to stably supply products at a low cost with this film.

Example 31

A film was obtained in the same manner as in Example 26, except that the lamination apparatus was changed to one having 101 slits. The thus obtained film exhibited the physical properties as shown in Table 6, and this film was almost the same as that of Example 26.

Example 32

A film was obtained in the same manner as in Example 26, except that the lamination apparatus was changed to one having 251 slits. The thus obtained film exhibited the physical properties as shown in Table 6, and the adhesiveness to PVA and the moist heat-resistant adhesiveness were comparable to those of the film of Example 26. Meanwhile, as compared to Example 26, the retardation was slightly suppressed.

Example 33

A film was obtained in the same manner as in Example 28, except that the discharge rates of the thermoplastic resins A and B were adjusted such that the ratio of the total thickness of the layers A and the total thickness of the layers B (total thickness of the layers A/total thickness of the layers B) became 1.0. The thus obtained film exhibited the physical properties as shown in Table 6, and the adhesiveness to PVA and the moist heat-resistant adhesiveness were comparable to those of the film of Example 28. Meanwhile, the increase in the ratio of the crystalline thermoplastic resin A resulted in increased retardation.

Example 34

A film was obtained in the same manner as in Example 28, except that the discharge rates of the thermoplastic resins A and B were adjusted such that the ratio of the total thickness of the layers A and the total thickness of the layers B (total thickness of the layers A/total thickness of the layers B) became 0.5. The thus obtained film exhibited the physical properties as shown in Table 6, and the adhesiveness to PVA and the moist heat-resistant adhesiveness were comparable to those of the film of Example 28. Meanwhile, the reduction in the ratio of the crystalline thermoplastic resin A resulted in suppression of retardation, and an interference color was hardly noticeable in an environment similar to the one where the film is actually mounted on a liquid crystal display.

Example 35

A film was obtained in the same manner as in Example 28, except that the discharge rate of the crystalline polyester and that of the thermoplastic resin B were adjusted such that the ratio of the total thickness of the layers A and the total thickness of the layers B (total thickness of the layers A/total thickness of the layers B) became 0.3. The thus obtained film exhibited the physical properties as shown in Table 6, and the adhesiveness to PVA and the moist heat-resistant adhesiveness were comparable to those of the film of Example 28. Meanwhile, the reduction in the ratio of the crystalline thermoplastic resin A resulted in suppression of retardation, and an interference color was hardly noticeable in an environment similar to the one where the film is actually mounted on a liquid crystal display.

Example 36

A film was obtained in the same manner as in Example 28, except that the discharge rate of the crystalline polyester and that of the thermoplastic resin B were adjusted such that the ratio of the total thickness of the layers A and the total thickness of the layers B (total thickness of the layers A/total thickness of the layers B) became 0.1. The thus obtained film exhibited the physical properties as shown in Table 6, and the adhesiveness to PVA and the moist heat-resistant adhesiveness were comparable to those of the film of Example 28. Meanwhile, the reduction in the ratio of the crystalline thermoplastic resin A resulted in significant suppression of retardation, and absolutely no interference color was observed in an environment similar to the one where the film is actually mounted on a liquid crystal display.

Example 37

A film was obtained in the same manner as in Example 36, except that the film thickness was changed to 15 µm. The thus obtained film exhibited the physical properties as shown in Table 6, and the adhesiveness to PVA and the moist heat-resistant adhesiveness were comparable to those of the film of Example 36. Meanwhile, the reduction in the film thickness lead to a further reduction in the thickness of the layers A composed of the thermoplastic resin A. This resulted in suppression of retardation, and absolutely no interference color was observed in an environment similar to the one where the film is actually mounted on a liquid crystal display.

Example 38

A film was obtained in the same manner as in Example 36, except that the film thickness was changed to 10 µm. The thus obtained film exhibited the physical properties as shown in Table 6, and the adhesiveness to PVA and the moist heat-resistant adhesiveness were comparable to those of the film of Example 36. Meanwhile, the reduction in the film thickness lead to a further reduction in the thickness of the layers A composed of the thermoplastic resin A. This resulted in suppression of retardation, and absolutely no interference color was observed in an environment similar to the one where the film is actually mounted on a liquid crystal display. However, since the film of Example 38 had somewhat poor ease of handling, when using this film as a polarizer protective film in the production of polarizing plates, a reduction in the yield due to generation of defective products or the like is concerned.

Example 39

A film was obtained in the same manner as in Example 34, except that the film thickness was changed to 50 µm. The thus obtained film exhibited the physical properties as shown in Table 6, and the adhesiveness to PVA and the moist heat-resistant adhesiveness were comparable to those of the film of Example 34. Meanwhile, the increase in the film thickness lead to an increase in the thickness of the layers A composed of the thermoplastic resin A. This resulted in increased retardation, and a slight interference color was observed in an environment similar to the one where the film is actually mounted on a liquid crystal display.

Example 40

A film was obtained in the same manner as in Example 34, except that the film thickness was changed to 75 µm. The thus obtained film exhibited the physical properties as shown in Table 6, and the adhesiveness to PVA and the moist heat-resistant adhesiveness were comparable to those of the film of Example 34. Meanwhile, the increase in the film thickness lead to an increase in the thickness of the layers A composed of the thermoplastic resin A. This resulted in increased retardation, and a prominent interference color was observed in an environment similar to the one where the film is actually mounted on a liquid crystal display.

Example 41

A film was obtained in the same manner as in Example 26, except that ethylene terephthalate copolymerized with 17.5 mol % of isophthalic acid (PET/I), which has a melting point of 210° C., was used as the thermoplastic resin B. The thus obtained film exhibited the physical properties as shown in Table 6, and the adhesiveness to PVA and the moist heat-resistant adhesiveness were comparable to those of the film of Example 26. Meanwhile, as compared to the film of Example 26 in which an amorphous resin was used, the film of Example 41 had somewhat increased retardation; however, the value thereof was sufficiently small and it presented no problem for the use of this film even in an environment similar to the one where the film is actually mounted on a liquid crystal display.

Example 42

A film was obtained in the same manner as in Example 26, except that a polyethylene naphthalate (PEN) having a melting point of 268° C. was used as the crystalline polyester and the polyethylene terephthalate used in Example 26 as a crystalline polyester was used as the thermoplastic resin B. The thus obtained film exhibited the physical properties as shown in Table 6, and the adhesiveness to PVA and the moist heat-resistant adhesiveness were comparable to those of the film of Example 26. On the other hand, as compared to the film of Example 26 in which an amorphous resin was used, the film of Example 41 showed significantly increased retardation and a prominent interference color was observed in an environment similar to the one where the film is actually mounted on a liquid crystal display.

Example 43

A film was obtained in the same manner as in Example 26, except that the lamination apparatus was changed to one having 401 slits. It is noted here that the lamination apparatus used here was designed to produce films that reflect light having a wavelength of 850 to 1,200 nm at a thickness of 78 μm. The thus obtained film exhibited the physical properties as shown in Table 7, and the adhesiveness to PVA and PVB and the moist heat-resistant adhesiveness were comparable to those of the film of Example 1. In addition, this film was capable of reflecting near-infrared radiations in the wavelength range of 850 to 1,200 nm, and a laminated glass which was actually prepared using this film was capable of better shielding incoming sunlight by not less than 20% than a laminated glass that did not contain this film.

TABLE 1

| | Constant (dyne/cm) | | | |
|---|---|---|---|---|
| | Dispersion force component $\gamma_L^d$ | Polar force component $\gamma_L^p$ | Hydrogen bonding component $\gamma_L^h$ | Surface free energy $\gamma_L$ |
| Pure water | 10.8 | 22.7 | 38.5 | 72.0 |
| Ethylene glycol | 17.5 | 4.7 | 26.0 | 48.2 |
| Formamide | 18.1 | 26.3 | 13.9 | 58.3 |
| Diiodomethane | 43.7 | 1.3 | 2.7 | 47.7 |

TABLE 2

| | | | Example 1 | Example 2 | Example 3 | Example 4 | Example 5 | Example 6 | Example 7 | Example 8 |
|---|---|---|---|---|---|---|---|---|---|---|
| Resin composition | Acrylic-modified polyester (A) | — | | | | | Acryl (iii) | | | |
| | Aliphatic urethane resin (B) | — | | | Aliphatic (i) | | | | Alicyclic (i) | |
| | Mixing ratio (A) | parts by mass | 90 | 60 | 50 | 20 | 90 | 60 | 50 | 20 |
| | (B) | parts by mass | 10 | 40 | 50 | 80 | 10 | 40 | 50 | 80 |
| | (C) | parts by mass | 0 | 0 | 0 | 0 | 0 | 0 | 0 | 0 |
| | Total content of (A) and (B) in resin composition (II) | % by mass | 98 | 98 | 98 | 98 | 98 | 98 | 98 | 98 |
| | Glass transition temperature of resin layer (α) | ° C. | 21 | 32 | 31 | 42 | 26 | 37 | 36 | 44 |
| Laminated film | Thermoplastic resin A | — | | | | | PET | | | |
| | Thermoplastic resin B | — | | | | | — | | | |
| | Number of laminated layers | — | | | | | 1 | | | |
| | Total thickness of layers A/Total thickness of layers B | — | | | | | — | | | |
| | Film thickness | μm | | | | | 25 | | | |
| | Film width | mm | | | | | 400 | | | |

| | | | Example 9 | Example 10 | Example 11 | Example 12 | Example 13 | Example 14 | Example 15 |
|---|---|---|---|---|---|---|---|---|---|
| Resin composition | Acrylic-modified polyester (A) | — | Acryl (iii) | Acryl (i) | Acryl (ii) | Acryl (iv) | Acryl (v) | Acryl (iii) | |
| | Aliphatic urethane resin (B) | — | Alicyclic (ii) | Alicyclic (i) | | | Alicyclic (i) | | |
| | Mixing ratio (A) | parts by mass | 60 | 60 | 60 | 60 | 60 | 60 | 60 |
| | (B) | parts by mass | 40 | 40 | 40 | 40 | 40 | 40 | 40 |
| | (C) | parts by mass | 0 | 0 | 0 | 0 | 0 | 20 | 60 |
| | Total content of (A) and (B) in resin composition (II) | % by mass | 98 | 98 | 98 | 98 | 98 | 82 | 62 |
| | Glass transition temperature of resin layer (α) | ° C. | 36 | 30 | 29 | 34 | 32 | 30 | 28 |
| Laminated film | Thermoplastic resin A | — | | | | | | | |
| | Thermoplastic resin B | — | | | | | | | |

TABLE 2-continued

|  |  |  |
|---|---|---|
| Number of laminated layers | — |  |
| Total thickness of layers A/Total thickness of layers B | — |  |
| Film thickness | μm |  |
| Film width | mm |  |

TABLE 3

|  |  |  | Example 16 | Example 17 | Example 18 | Example 19 | Example 20 | Example 21 | Example 22 | Example 23 |
|---|---|---|---|---|---|---|---|---|---|---|
| Resin composition | Acrylic-modified polyester (A) | — |  |  |  |  | Acryl (iii) |  |  |  |
|  | Aliphatic urethane resin (B) | — | Alicyclic (i) |  |  |  |  | Alicyclic (i) |  |  |
|  | Mixing ratio (A) | parts by mass | 60 | 60 | 60 | 60 | 90 | 50 | 60 | 60 |
|  | (B) | parts by mass | 40 | 40 | 40 | 40 | 10 | 50 | 40 | 40 |
|  | (C) | parts by mass | 20 | 20 | 30 | 40 | 20 | 20 | 20 | 40 |
|  | Total content of (A) and (B) in resin composition (II) | % by mass | 82 | 82 | 82 | 70 | 82 | 82 | 82 | 70 |
|  | Glass transition temperature of resin layer (α) | °C. | 32 | 42 | 34 | 31 | 25 | 34 | 35 | 31 |
| Laminated film | Thermoplastic resin A | — | PET | PET | PET | PET | PET | PET | PET | PET |
|  | Thermoplastic resin B | — | — | — | — | — | — | — | — | — |
|  | Number of laminated layers | — | 1 | 1 | 1 | 1 | 1 | 1 | 1 | 1 |
|  | Total thickness of layers A/Total thickness of layers B | — | — | — | — | — | — | — | — | — |
|  | Film thickness | μm | 25 | 25 | 25 | 25 | 25 | 25 | 25 | 25 |
|  | Film width | mm | 400 | 400 | 400 | 400 | 400 | 400 | 400 | 400 |

|  |  |  | Example 24 | Example 25 | Comparative Example 1 | Comparative Example 2 | Comparative Example 3 | Comparative Example 4 | Comparative Example 5 |
|---|---|---|---|---|---|---|---|---|---|
| Resin composition | Acrylic-modified polyester (A) | — |  |  | Acryl (iii) |  |  | Acryl (vi) | Acryl (iii) |
|  | Aliphatic urethane resin (B) | — | Alicyclic (i) |  | Aromatic (i) |  | Aliphatic (i) |  |  |
|  | Mixing ratio (A) | parts by mass | 100 | 100 | 60 | 60 | 60 | 90 | 60 |
|  | (B) | parts by mass |  |  | 40 | 40 | 40 | 10 | 40 |
|  | (C) | parts by mass | 0 | 0 | 0 | 0 | 0 | 0 | 0 |
|  | Total content of (A) and (B) in resin composition (II) | % by mass | 98 | 98 | 98 | 82 | 98 | 98 | 82 |
|  | Glass transition temperature of resin layer (α) | °C. | 28 | 24 | 42 | 33 | 32 | 26 | 29 |
| Laminated film | Thermoplastic resin A | — | PET | PET | PET | PET | PET | PET | PET |
|  | Thermoplastic resin B | — | — | — | — | — | — | — | — |
|  | Number of laminated layers | — | 1 | 1 | 1 | 1 | 1 | 1 | 1 |
|  | Total thickness of layers A/Total thickness of layers B | — | — | — | — | — | — | — | — |
|  | Film thickness | μm | 25 | 25 | 25 | 25 | 25 | 25 | 25 |
|  | Film width | mm | 400 | 400 | 400 | 400 | 400 | 400 | 400 |

TABLE 4

|  |  |  |  | Example 1 | Example 2 | Example 3 | Example 4 | Example 5 | Example 6 | Example 7 | Example 8 |
|---|---|---|---|---|---|---|---|---|---|---|---|
| Surface Properties | Resin layer (α) | Dispersion force | (mN/m) | 24 | 25 | 27 | 30 | 26 | 28 | 29 | 30 |
|  |  | Polar force | (mN/m) | 8 | 10 | 11 | 14 | 7 | 9 | 10 | 13 |
|  |  | Surface free energy | (mN/m) | 32 | 35 | 38 | 44 | 33 | 37 | 39 | 43 |
|  | 10-point average roughness |  | nm | 231 | 251 | 265 | 223 | 246 | 267 | 295 | 241 |
|  | Evaluation of adhesiveness | PVAa | — | B | A | A | A | B | A | A | A |
|  |  | PVAb | — | B | A | A | A | A | A | A | A |
|  |  | PVAc | — | B | A | A | B | A | A | A | A |
|  |  | PVAd | — | A | A | A | B | A | A | A | B |
|  |  | PVB | — | A | A | A | B | A | A | A | B |
|  |  | EVAa | — | B | A | A | A | B | A | A | A |
|  |  | EVAb | — | B | A | A | A | A | A | A | A |
|  |  | EVAc | — | B | A | A | B | A | A | A | A |
|  |  | EVAd | — | A | A | A | B | A | A | A | B |
|  | Evaluation of moist-heat resistant adhesiveness | PVAa | — | B | A | A | A | B | A | A | A |
|  |  | PVAb | — | B | A | A | A | B | A | A | A |
|  |  | PVAc | — | B | A | A | B | A | A | A | B |
|  |  | PVAd | — | A | A | A | B | A | A | A | B |
|  |  | PVB | — | B | A | A | B | B | A | A | B |
|  |  | EVAa | — | B | A | A | A | B | A | A | A |
|  |  | EVAb | — | B | A | A | A | B | A | A | A |
|  |  | EVAc | — | B | A | A | B | A | A | A | B |
|  |  | EVAd | — | A | A | A | B | A | A | A | B |

|  |  |  |  | Example 9 | Example 10 | Example 11 | Example 12 | Example 13 | Example 14 | Example 15 |
|---|---|---|---|---|---|---|---|---|---|---|
| Surface Properties | Resin layer (α) | Dispersion force | (mN/m) | 27 | 27 | 27 | 25 | 28 | 27 | 25 |
|  |  | Polar force | (mN/m) | 12 | 14 | 12 | 12 | 10 | 8 | 5 |
|  |  | Surface free energy | (mN/m) | 39 | 41 | 39 | 37 | 38 | 35 | 30 |
|  | 10-point average roughness |  | nm | 263 | 235 | 281 | 243 | 238 | 243 | 141 |
|  | Evaluation of adhesiveness | PVAa | — | A | A | A | A | A | A | A |
|  |  | PVAb | — | A | A | A | A | A | A | A |
|  |  | PVAc | — | A | A | A | A | A | A | A |
|  |  | PVAd | — | A | A | A | A | A | A | A |
|  |  | PVB | — | A | A | A | A | A | A | B |
|  |  | EVAa | — | A | A | A | A | A | A | B |
|  |  | EVAb | — | A | A | A | A | A | A | B |
|  |  | EVAc | — | A | A | A | A | A | A | B |
|  |  | EVAd | — | A | A | A | A | A | A | B |
|  | Evaluation of moist-heat resistant adhesiveness | PVAa | — | A | A | A | A | A | A | A |
|  |  | PVAb | — | A | A | A | A | A | A | A |
|  |  | PVAc | — | A | A | A | A | A | A | A |
|  |  | PVAd | — | A | A | A | A | A | A | A |
|  |  | PVB | — | A | A | A | A | A | A | B |
|  |  | EVAa | — | A | A | A | A | A | A | B |
|  |  | EVAb | — | A | A | A | A | A | A | B |
|  |  | EVAc | — | A | A | A | A | A | A | B |
|  |  | EVAd | — | A | A | A | A | A | A | A |

TABLE 5

|  |  |  |  | Example 16 | Example 17 | Example 18 | Example 19 | Example 20 | Example 21 | Example 22 | Example 23 |
|---|---|---|---|---|---|---|---|---|---|---|---|
| Surface Properties | Resin layer (α) | Dispersion force | (mN/m) | 25 | 27 | 27 | 29 | 27 | 28 | 28 | 29 |
|  |  | Polar force | (mN/m) | 5 | 11 | 13 | 15 | 9 | 14 | 15 | 12 |
|  |  | Surface free energy | (mN/m) | 30 | 38 | 40 | 44 | 36 | 42 | 43 | 41 |
|  | 10-point average roughness |  | nm | 198 | 181 | 157 | 142 | 153 | 210 | 193 | 153 |
|  | Evaluation of adhesiveness | PVAa | — | A | A | A | A | A | A | A | A |
|  |  | PVAb | — | A | A | A | A | A | A | A | A |
|  |  | PVAc | — | A | A | A | A | A | A | A | A |
|  |  | PVAd | — | A | A | A | A | A | A | A | A |
|  |  | PVB | — | B | B | B | C | B | B | B | B |
|  |  | EVAa | — | A | A | B | B | B | A | A | B |
|  |  | EVAb | — | A | A | B | B | A | A | A | A |
|  |  | EVAc | — | A | A | B | A | A | A | A | A |
|  |  | EVAd | — | A | A | A | A | A | A | A | A |

TABLE 5-continued

|  |  |  |  |  |  |  |  |  |  |  |  |
|---|---|---|---|---|---|---|---|---|---|---|---|
| Evaluation of moist-heat resistant adhesiveness | PVAa | — | A | A | A | A | B | A | A | A |
|  | PVAb | — | A | A | A | A | A | A | A | A |
|  | PVAc | — | A | A | A | A | A | A | A | A |
|  | PVAd | — | A | A | A | A | A | A | A | A |
|  | PVB | — | B | B | B | C | B | B | B | B |
|  | EVAa | — | A | B | B | B | B | B | B | B |
|  | EVAb | — | A | A | B | B | B | B | A | B |
|  | EVAc | — | A | A | A | B | B | A | A | A |
|  | EVAd | — | A | A | A | B | B | A | A | A |

|  |  |  |  | Example 24 | Example 25 | Comparative Example 1 | Comparative Example 2 | Comparative Example 3 | Comparative Example 4 | Comparative Example 5 |
|---|---|---|---|---|---|---|---|---|---|---|
| Surface Properties | Resin layer (α) | Dispersion force | (mN/m) | 27 | 25 | 22 | 18 | 31 | 35 | 27 |
|  |  | Polar force | (mN/m) | 10 | 9 | 14 | 9 | 18 | 4 | 35 |
|  |  | Surface free energy | (mN/m) | 39 | 37 | 36 | 27 | 49 | 39 | 62 |
|  | 10-point average roughness |  | nm | 105 | 94 | 361 | 218 | 253 | 261 | 141 |
|  | Evaluation of adhesiveness | PVAa | — | B | B | B | could not be evaluated due to delamination | A | C | A |
|  |  | PVAb | — | B | B | B |  | A | C | A |
|  |  | PVAc | — | B | B | A |  | B | B | A |
|  |  | PVAd | — | B | B | C |  | C | B | B |
|  |  | PVB | — | B | B | B |  | B | B | B |
|  |  | EVAa | — | B | B | B |  | A | C | A |
|  |  | EVAb | — | B | B | A |  | A | C | A |
|  |  | EVAc | — | B | B | C |  | B | B | A |
|  |  | EVAd | — | B | B | C |  | C | B | A |
|  | Evaluation of moist-heat resistant adhesiveness | PVAa | — | B | B | C |  | C | C | D |
|  |  | PVAb | — | B | B | C |  | C | C | D |
|  |  | PVAc | — | B | B | C |  | C | B | D |
|  |  | PVAd | — | B | B | C |  | D | B | D |
|  |  | PVB | — | B | B | C |  | C | C | D |
|  |  | EVAa | — | B | B | C |  | C | C | D |
|  |  | EVAb | — | B | B | C |  | C | C | D |
|  |  | EVAc | — | B | B | C |  | C | B | D |
|  |  | EVAd | — | B | B | C |  | D | B | C |

TABLE 6

|  |  |  |  | Example 26 | Example 27 | Example 28 | Example 29 | Example 30 | Example 31 | Example 32 | Example 33 | Example 34 |
|---|---|---|---|---|---|---|---|---|---|---|---|---|
| Laminated film | Thermoplastic resin A | — |  |  |  |  |  | PET |  |  |  |  |
|  | Thermoplastic resin B | — |  |  |  |  | SPG-copolymerized PET |  |  |  |  |  |
|  | Number of laminated layers | — |  |  | 51 |  | 11 | 3 | 101 | 251 | 51 |  |
|  | Total thickness of layers A/ Total thickness of layers B | — |  |  |  |  | 0.7 |  |  |  | 1.0 | 0.5 |
|  | Film thickness | µm |  |  |  |  |  | 25 |  |  |  |  |
|  | Film width | mm |  |  |  |  |  | 400 |  |  |  |  |
| Physical properties | Retardation | End A | nm | 110 | 118 | 113 | 123 | 285 | 115 | 95 | 142 | 85 |
|  |  | Center | nm | 25 | 19 | 21 | 14 | 32 | 16 | 17 | 21 | 14 |
|  |  | End B | nm | 145 | 138 | 125 | 153 | 294 | 132 | 89 | 162 | 92 |
|  | Difference in the orientation angle between both ends of the film and the center of the film | ° |  | 35 | 15 | 9 | 36 | 39 | 35 | 35 | 9 | 9 |
|  | Visibility | — |  | ○ | ○ | ○ | ○ | X | ○ | ◎ | ○ | ◎ |

|  |  |  | Example 35 | Example 36 | Example 37 | Example 38 | Example 39 | Example 40 | Example 41 | Example 42 |
|---|---|---|---|---|---|---|---|---|---|---|
| Laminated film | Thermoplastic resin A | — |  |  | PET |  |  |  |  | PEN |
|  | Thermoplastic resin B | — |  |  | SPG-copolymerized PET |  |  |  | PET/I | PET |
|  | Number of laminated layers | — |  |  |  | 51 |  |  |  |  |
|  | Total thickness of layers A/ Total thickness of layers B | — | — | 0.3 | 0.1 |  |  | 0.5 |  | 0.7 |

TABLE 6-continued

| | | | | | | | | | | | |
|---|---|---|---|---|---|---|---|---|---|---|---|
| Physical properties | Film thickness | | μm | | 25 | 15 | 10 | 50 | 75 | | 25 |
| | Film width | | mm | | | | | 400 | | | |
| | Retardation | End A | nm | 58 | 25 | 16 | 9 | 190 | 321 | 178 | 325 |
| | | Center | nm | 9 | 5 | 3 | 2 | 31 | 32 | 35 | 21 |
| | | End B | nm | 49 | 23 | 11 | 8 | 198 | 295 | 169 | 351 |
| | Difference in the orientation angle between both ends of the film and the center of the film | | ° | 9 | 9 | 9 | 9 | 9 | 9 | 34 | 34 |
| | Visibility | | — | | ◎ | ◎ | ◎ | ◎ | ○ | X | ○ | X |

TABLE 7

| | | | Example 1 | Example 43 |
|---|---|---|---|---|
| Laminated film | Thermoplastic resin A | — | | PET |
| | Thermoplastic resin B | — | — | SPG-copolymerized PET |
| | Number of laminated layers | — | 1 | 401 |
| | Total thickness of layers A/Total thickness of layers B | — | — | 1.0 |
| | Film thickness | μm | 25 | 78 |
| | Film width | mm | 400 | 400 |
| Physical properties | Average reflectance (900 to 1,200 nm) | % | 10 | 89 |
| | Average reflectance (%) (400 to 700 nm) | % | 10 | 8 |
| | Total light transmittance | % | 90 | 90 |
| | Haze | % | 1.0 | 1.2 |
| | Internal haze | % | 0.1 | 0.3 |

INDUSTRIAL APPLICABILITY

The present invention relates to a laminated film applied to a heat ray-shielding glass capable of inhibiting the inflow of heat, particularly the heat from sunlight. In the production of a laminated glass, the laminated film exhibits general adhesiveness to various PVAs and is capable of retaining the adhesiveness even in a high-temperature and high-humidity environment; therefore, the laminated film can be suitably used in a heat ray-shielding glass.

The invention claimed is:

1. A laminated film, comprising a resin layer (α) composed of an aliphatic urethane structure-containing resin composition (I) on at least one side of a thermoplastic resin film, said resin layer (α) satisfying the following properties (i) and (ii):
   (i) said resin layer (α) has a surface free energy (sum of the dispersion force and the polar force) of not less than 30 mN/m and not greater than 45 mN/m;
   (ii) said resin layer (α) has a polar force of not less than 5.0 mN/m and not greater than 15.0 mN/m,
   wherein said resin composition (I) is formed by coating a resin composition (II) on said thermoplastic resin film, and said resin composition (II) is a blend of an acrylic-modified polyester resin (A) and an aliphatic urethane resin (B) in a mass ratio of 50/50 to 90/10; and
   wherein said laminated film has a 10-point average roughness (Rz) of not less than 150 nm, and has an irregular shape that is formed by the resin layer (α) composed of the resin composition (I).

2. The laminated film according to claim 1, wherein said aliphatic urethane structure of said resin composition (I) is an alicyclic urethane structure.

3. The laminated film according to claim 2, wherein said resin composition (I) comprises at least one of the structures represented by the following Formulae (1) to (5):

$R_1$: H or $CH_3$

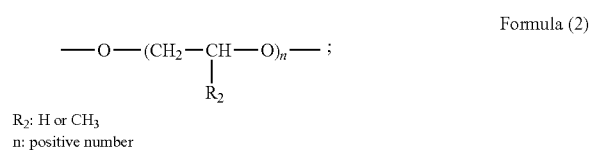

$R_2$: H or $CH_3$
n: positive number

X: 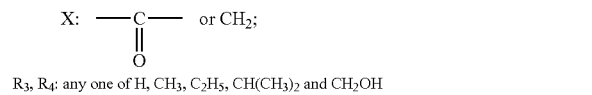

$R_3$, $R_4$: any one of H, $CH_3$, $C_2H_5$, $CH(CH_3)_2$ and $CH_2OH$

$R_5$, $R_6$, $R_7$: $CH_3$ or $C_2H_5$

—$CH_2$—CH—$CH_2$.
\\ /
O

Formula (5)

4. The laminated film according to claim 1, wherein said resin composition (II) is a hydrophilic solution.

5. The laminated film according to claim 1, wherein the total content of said acrylic-modified polyester resin (A) and said aliphatic urethane resin (B) is not less than 60% by mass with respect to the total amount said resin composition (II).

6. The laminated film according to claim 1, wherein said resin composition (II) comprises a melamine compound and/or a carbodiimide compound.

7. The laminated film according to claim 6, wherein the total mass of said melamine compound and/or said carbodiimide compound in said resin composition (II) is not less than 10 parts by mass and not more than 40 parts by mass, based on 100 parts by mass of the total amount of acrylic-modified polyester resin (A) and the aliphatic urethane resin (B).

8. The laminated film according to claim 1, having an internal haze of less than 0.5%.

9. The laminated film according to claim 8, wherein said thermoplastic resin film is a multilayer film having a structure in which layers composed of a thermoplastic resin A (layers A) and layers composed of a thermoplastic resin B (layers B) are alternately laminated in 5 or more layers.

10. The laminated film according to claim 9, having an average reflectance of not less than 70% in a wavelength range of 900 to 1,200 nm.

11. The laminated film according to claim 10, wherein said resin layer ($\alpha$) has a glass transition temperature of not lower than 20° C. and not higher than 45° C.

12. The laminated film according to claim 9, wherein said thermoplastic resin A is a crystalline polyester and said thermoplastic resin B is different from said crystalline polyester.

13. The laminated film according to claim 12, having a retardation of 280 nm or less.

14. A polarizing plate, comprising a combination of the laminated film according to claim 13 and a polarizer containing a polyvinyl alcohol as a main component.

* * * * *